United States Patent
Lindberg et al.

(10) Patent No.: US 10,019,850 B2
(45) Date of Patent: Jul. 10, 2018

(54) ADJUSTING LOCATION INDICATOR IN 3D MAPS

(71) Applicant: Apple Inc., Cupertino, CA (US)

(72) Inventors: Adrian Lindberg, Santa Clara, CA (US); Per Fahlberg, Sunnyvale, CA (US); Elisabeth Lindkvist, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/233,826

(22) Filed: Aug. 10, 2016

(65) Prior Publication Data

US 2016/0350982 A1 Dec. 1, 2016

Related U.S. Application Data

(63) Continuation of application No. 13/907,846, filed on May 31, 2013, now Pat. No. 9,418,485.

(51) Int. Cl.
| | |
|---|---|
| *G06T 15/00* | (2011.01) |
| *G06T 19/20* | (2011.01) |
| *G01C 21/36* | (2006.01) |
| *G06T 17/05* | (2011.01) |
| *G06F 3/0481* | (2013.01) |

(Continued)

(52) U.S. Cl.
CPC ............ *G06T 19/20* (2013.01); *G01C 21/367* (2013.01); *G06F 3/04815* (2013.01); *G06F 3/04842* (2013.01); *G06F 3/04845* (2013.01); *G06F 3/04883* (2013.01); *G06T 17/05* (2013.01);

(Continued)

(58) Field of Classification Search
None
See application file for complete search history.

(56) References Cited

U.S. PATENT DOCUMENTS

| | | |
|---|---|---|
| 4,914,605 A | 4/1990 | Loughmiller et al. |
| 5,717,848 A | 2/1998 | Watanabe et al. |

(Continued)

FOREIGN PATENT DOCUMENTS

| | | |
|---|---|---|
| EP | 1 788 541 A1 | 5/2007 |
| EP | 2 672 223 A1 | 12/2013 |

(Continued)

OTHER PUBLICATIONS

Argrawal, "Geometry-based Mapping and Rendering of Vector Data over LOD Phototextured 3D Terrain Models", Indian Institute of Information Technology, India, Jan. 2006, 8 pages.

(Continued)

*Primary Examiner* — Kyle Zhai
(74) *Attorney, Agent, or Firm* — Morgan, Lewis & Bockius LLP

(57) ABSTRACT

Some embodiments provide a mapping application that receives input to adjust an amount of tilt from which to view a 3D map for a viewing mode in which the 3D map is specified to be textured with camera captured images (CCIs) of the real world. The mapping application also adjusts a set of heights for a set of road path indicators in the 3D map based on the adjusted amount of tilt. Each road path indicator indicates a path of a road in the 3D map. The mapping application further displays the 3D map with the adjusted amount of tilt and the set of road path indicators at the adjusted set of heights in the 3D map.

20 Claims, 13 Drawing Sheets

(51) Int. Cl.
*G06F 3/0484* (2013.01)
*G06F 3/0488* (2013.01)

(52) U.S. Cl.
CPC ............. *G06T 2219/2016* (2013.01); *G06T 2219/2021* (2013.01)

(56) References Cited

U.S. PATENT DOCUMENTS

| | | |
|---|---|---|
| 6,321,158 B1 | 11/2001 | DeLorme et al. |
| 6,360,168 B1 | 3/2002 | Shimabara |
| 6,597,354 B2 | 7/2003 | Sakamoto et al. |
| 6,972,757 B2 | 12/2005 | Arikawa et al. |
| 6,999,075 B2 | 2/2006 | Kumagai |
| 7,746,343 B1 | 6/2010 | Charaniya et al. |
| 8,355,862 B2 | 1/2013 | Matas et al. |
| 8,464,182 B2 | 6/2013 | Blumenberg et al. |
| 8,600,654 B2 | 12/2013 | Kishikawa et al. |
| 8,606,516 B2 | 12/2013 | Vertelney et al. |
| 8,607,167 B2 | 12/2013 | Matas et al. |
| 8,639,654 B2 | 1/2014 | Vervaet et al. |
| 2001/0028350 A1 | 10/2001 | Matsuoka et al. |
| 2005/0243104 A1 | 11/2005 | Kinghom |
| 2006/0074553 A1 | 4/2006 | Foo et al. |
| 2006/0224311 A1 | 10/2006 | Watanabe et al. |
| 2006/0247845 A1 | 11/2006 | Cera et al. |
| 2007/0195089 A1 | 8/2007 | Furukado |
| 2008/0040024 A1 | 2/2008 | De Silva |
| 2008/0062173 A1 | 3/2008 | Tashiro |
| 2008/0148175 A1 | 6/2008 | Naaman et al. |
| 2008/0198158 A1 | 8/2008 | Iwamura et al. |
| 2009/0187335 A1 | 7/2009 | Muhlfelder et al. |
| 2009/0273601 A1 | 11/2009 | Kim |
| 2010/0085350 A1* | 4/2010 | Mishra ............... G01C 21/3638 345/419 |
| 2010/0225644 A1 | 9/2010 | Swope et al. |
| 2011/0249030 A1 | 10/2011 | Hirose et al. |
| 2012/0120104 A1 | 5/2012 | Kuhne |
| 2012/0240077 A1* | 9/2012 | Vaittinen ............. G06F 3/04815 715/781 |
| 2012/0314040 A1 | 12/2012 | Kopf et al. |
| 2013/0060540 A1 | 3/2013 | Frahm et al. |
| 2013/0083017 A1 | 4/2013 | Fong et al. |
| 2013/0162534 A1* | 6/2013 | Chen ..................... G06F 3/0346 345/158 |
| 2013/0173040 A1 | 7/2013 | Wells et al. |
| 2013/0325339 A1 | 12/2013 | McCarthy |
| 2013/0325342 A1 | 12/2013 | Pylappan et al. |
| 2013/0328861 A1 | 12/2013 | Arikan et al. |
| 2013/0328915 A1 | 12/2013 | Arikan et al. |
| 2013/0328916 A1 | 12/2013 | Arikan et al. |
| 2013/0328924 A1 | 12/2013 | Arikan et al. |
| 2014/0267279 A1 | 9/2014 | Kontkanen |

FOREIGN PATENT DOCUMENTS

| | | |
|---|---|---|
| EP | 2 672 225 A1 | 12/2013 |
| EP | 2 672 226 A2 | 12/2013 |
| WO | WO 86/02764 | 5/1986 |
| WO | WO 2011/146141 A1 | 11/2011 |
| WO | WO 2012/034581 A1 | 3/2012 |
| WO | WO 2013/184348 A2 | 12/2013 |
| WO | WO 2013/184444 A2 | 12/2013 |
| WO | WO 2013/184445 A2 | 12/2013 |
| WO | WO 2013/184449 A2 | 12/2013 |
| WO | WO 2013/184450 A2 | 12/2013 |

OTHER PUBLICATIONS

Garmin, "Nuvi 100/1200/1300/1400 Series Owner's Manual", Garmin Corporation, No. 68, Jangshu 2nd Road, Sijhih, Taipei County, Taiwan, Jan. 17, 2011, 72 pages.

Google, "Android 2.3.4 User's Guide", Google Inc., May 20, 2011, 384 pages.

Nurminen et al, "10 Designing Interactions for Navigation in 3D Mobile Maps", Helsinki Institute for Information Technology, Finland, Aug. 6, 2008, 31 pages.

Ruhs, "My Favorite Android Apps: Maps", https://www.youtube.com/watch?v=2aRkLkLT3s, Jun. 24, 2011, 2 pages.

Toyota, "'Touch & Go' Owner's Manual", Toyota, United Kingdom, Jul. 2011, 217 pages.

YouTube, "Google Maps Voice Navigation in Singapore", https://www.youtube.com/watch?v=7B9JN7BkvME, Jul. 20, 2011, 2 pages.

Office Action, dated Feb. 18, 2015, received in U.S. Appl. No. 13/907,846, 28 pages.

Final Office Action, dated Nov. 27, 2015, received in U.S. Appl. No. 13/907,846, 31 pages.

Notice of Allowance, dated Apr. 7, 2016, received in U.S. Appl. No. 13/907,846, 12 pages.

* cited by examiner

ADJUSTING LOCATION INDICATOR IN 3D MAPS

RELATED APPLICATION

This application is a continuation of U.S. application Ser. No. 13/907,846, filed May 31, 2013, which is incorporated herein by reference in its entirety.

BACKGROUND

Many map-based applications are available today are designed for a variety of different devices (e.g., desktops, laptops, tablet devices, smartphones, handheld global positioning system (GPS) receivers, etc.) and for various different purposes (e.g., navigation, browsing, sports, etc.). Most of these applications generate displays of a map based on map data that describes the relative location of streets, highways, points of interest, etc. in the map.

Some map-based applications provide different types of views of the map and allow users to select a type of view for the application to use to display the map. Examples of such types of views include a map view, a satellite view, a hybrid view, etc. For some or all of the different types of views of the map, a number of map-based applications provide a two-dimensional (2D) viewing mode, a three-dimensional (3D) viewing mode, or both viewing modes.

BRIEF SUMMARY

Some embodiments of the invention provide a novel mapping application that includes a hybrid-viewing mode for viewing a three-dimensional (3D) map. In some embodiments, when the mapping application is in the hybrid-viewing mode, the mapping application renders map views of the 3D map using camera-captured images (CCIs) and map labels. The map labels of some embodiments includes road indicators, road labels, road direction indicators, points of interest (POI) indicators, POI labels, city labels, city indicators, state labels, continent labels, body of water labels, etc.

The mapping application of some embodiments renders map labels differently based on different views of the 3D map. For instance, in some embodiments, the mapping application renders road indicators (also referred to as road ribbons or road path indicators) differently based on different perspectives of the 3D map. When rendering road indicators in a map view of the 3D map, the mapping application of some embodiments adjusts the positions of the polygons in the 3D map that represent the road indicators based on the perspective of the map view, before rendering the map view.

In some embodiments, the mapping application renders different map labels based on different views of the 3D map. For example, the mapping application of some embodiments renders different map labels based on different distances (e.g., zoom levels) from the 3D map. In some embodiments, the mapping application renders road indicators for streets when rendering map views of the 3D map at close distances (e.g., high zoom levels), renders road indicators for highways when rendering map views of the 3D map at medium distances (e.g., medium zoom levels), and does not render any road indicators when rendering map views of the 3D map at far distances (e.g., low zoom levels).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one of ordinary skill in the art that the invention is not limited to the embodiments set forth and that the invention may be practiced without some of the specific details and examples discussed.

Some embodiments of the invention provide a novel mapping application that includes a hybrid-viewing mode for viewing a three-dimensional (3D) map. In some embodiments, when the mapping application is in the hybrid-viewing mode, the mapping application renders map views of the 3D map using camera-captured images (CCIs) and map labels. The map labels of some embodiments includes road indicators, road labels, road direction indicators, points of interest (POI) indicators, POI labels, city labels, city indicators, state labels, continent labels, body of water labels, etc.

Figure 1:
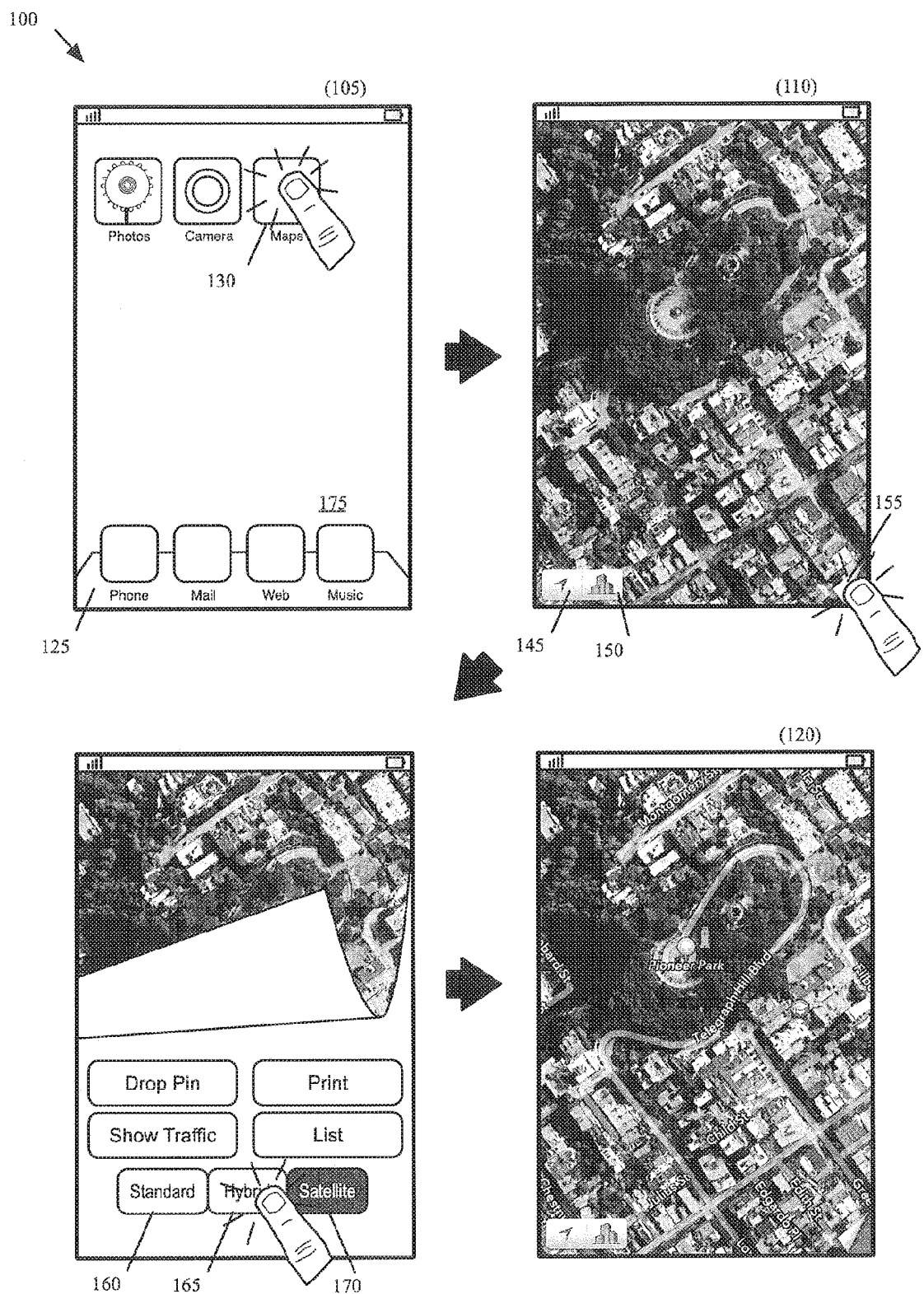
FIG. 1 conceptually illustrates a device that executes a mapping application of some embodiments that provides several different viewing modes.

FIG. 1 conceptually illustrates a device 100 that executes a mapping application of some embodiments that provides several different viewing modes. Specifically, FIG. 1 illustrates four different stages 105-120 of interaction with the mapping application.

The first stage 105 shows the device 100's graphical user interface (GUI) 175, which includes several selectable user interface (UI) items (e.g., icons) of several applications in a dock area 125 and on a page of the GUI 175. One of the selectable UI items displayed on the page at this stage 105 is a selectable UI item 130 for invoking the mapping application. As illustrated in the first stage 105, a user is selecting the UI item 130 through touch contact with the device's display screen at the location of UI item 130 in order to open the mapping application.

The second stage 110 shows the device 100 after the mapping application has opened. As shown in this stage, the mapping application is displaying a view of a 3D map (also referred to as a map view) from a top-down perspective of the 3D map. In this example, the mapping application starts in a satellite-viewing mode. When the mapping application is in a satellite-viewing mode, the mapping application of some embodiments renders map views using CCIs. In some embodiments, CCIs are images of the real world captured by real cameras operated by humans and/or machines (as opposed to a virtual camera that is used for rendering views of a 3D model). CCIs include images captured by real cameras on satellites, fly-by captured images (e.g., images captured by real cameras on airplanes, space shuttles, helicopters, balloons, and/or any other device used for aerial photography), drive-by captured images (e.g., images captured by real cameras on cars, trucks, motorcycles, buses, bicycles, trains, and/or any other type of vehicle that operates on land), etc. CCIs are referred to as real world captured images in some embodiments. The mapping application of some embodiments renders satellite map views by texture mapping CCIs to the map, map elements, and/or map constructs in the 3D map.

In some embodiments, a map service generates 3D model of a map that represents the real world based on geographical data collected from the real world. Some or all of the 3D primitives (e.g., points, lines, polygons, surfaces, etc.) of the 3D model of the map include location data that maps the to the corresponding location in the real world. In some embodiments, when a capturing device (e.g., a real camera) captures CCIs, the capturing device also records the location (e.g., GPS data) and position of the capturing device.

Based on information regarding the location and position of a capturing device used to capture a particular CCI, the map service of some embodiments identifies positions in the 3D model of the map to which pixels and/or groups of pixels in the particular CCI correlate. In some embodiments, the map service then maps the particular CCI to the 3D model of the map based on the identified positions. Such mapping, in some embodiments, is referred to as texture mapping. In some embodiments, the map service manipulates (e.g., rotated, translated, scaled, etc.) the particular CCI to better align the elements in the particular CCI with corresponding elements in the 3D model of the map.

In some embodiments, the mapping application renders map views using the 3D model of the map textured with CCIs by accessing (e.g., through the Internet) the map service described above and retrieving data (e.g., stored as satellite map tiles) representing a portion of the 3D model of the map from which the mapping application renders the map views. The data includes in some embodiments polygons that represent the map elements and/or map constructs in the portion of the 3D model and the corresponding CCIs with which the mapping application texture maps to the polygons. Such rendering is referred to in some embodiments as stereographic rendering using on CCIs. In some embodiments, the mapping application renders such map views of the 3D model of the map when the mapping application is in a satellite-viewing mode and rendering 3D satellite map views described in this application. Details of generating 3D maps with CCIs are described in PCT Application PCT/EP2011/054155, entitled "3D Streets." PCT Application PCT/EP2011/054155 is incorporated herein by reference.

In addition, the second stage 110 of FIG. 1 shows the mapping application displaying a set of floating controls. The set of floating controls in this example include a position control 145, a 3D control 150, and a page curl control 155. The position control 145 is for transitioning to a map view that includes the current position of the device 100. For instance, when the position control 145 is selected, the mapping application of some embodiments transitions to a map view in which the current position of the device 100 is located approximately in the center of the map view (e.g., the center of a display screen of the device 100). In some embodiments, the mapping application maintains such a map view as the device 100 is moving. The mapping application of some embodiments also identifies the direction to which the device 100 currently points. In some embodiments, the mapping application identifies the location of the device 100 using global positioning system (GPS) signals that the device 100 receives from GPS satellites. Alternatively or conjunctively, the mapping application uses other methods (e.g., cell tower triangulation) to compute the current location of the device 100.

The 3D control 150 is a control for enabling and disabling a feature that allows for browsing a map or a route along the map in three dimensions (3D). In some embodiments, the mapping application provides the 3D control 150 in order to quickly switch between a two-dimensional (2D) view of the map and a 3D view of the map. The 3D control 150 also serves as (1) an indicator that the current view of the map is a 3D view and (2) an indicator that a 3D perspective is available for a given map view (e.g., a 3D view might not be available when the map view is zoomed out past a defined threshold zoom level). In some embodiments, the mapping application provides different appearances of the 3D control 150 that correspond to some of these indications. For instance, in some embodiments, the mapping application presents the "3D" in the 3D control 150 as appearing grey when the 3D view of the map is unavailable, appearing black when the 3D view is available but the map is in the 2D view, and appearing blue when the map is in the 3D view. The mapping application of some embodiments presents a fourth appearance (e.g., a building image or shape instead of the "3D" characters as shown in this example) of the 3D control 150 when the mapping application is in a satellite-viewing mode and a 3D view of the map is available (e.g., when the zoom level of the map view is greater than a defined threshold zoom level). As shown in the second stage 110, 3D feature is enabled (e.g., by selecting the 3D control 150), as indicated in this example by a highlighting of the 3D control 150. As such, the mapping application is presenting a 3D view of a map.

The page curl control 155 is a control that allows the mapping application to minimize the number of on-screen controls, by placing certain less frequently used options in a secondary UI screen, which is accessible through a selection of the page curl control 155. In this manner, the page curl control 155 allows the mapping application to display more of the map while offering an unobtrusive way to access further functionality that is provided by the other set of controls.

In some embodiments, the page curl control 155 is permanently displayed on at least some of the map views that the mapping application provides. For instance, in some embodiments, the mapping application displays the page curl control 155 permanently when the mapping application is in a map-browsing mode, location-searching mode, or route-identification mode. The mapping application of some embodiments does not provide the page curl control 155 in map views where the additional functionality is deemed to be inappropriate to the task at hand. For instance, in some embodiments, the mapping application does not present the page curl control 155 while the mapping application is in a route-navigation mode.

The page curl control 155 indicates the location of another set of controls that are conceptually "behind" or "under" the current view. When the page curl control 155 is selected, the mapping application presents an animation that "peels" off the current view to display another view that shows the other set of controls. The third stage 115 illustrates the mapping application after the user selects (or selects and drags) the page curl control 155 and the mapping application presents such an animation. While FIG. 1 illustrates presenting another set of controls by selecting the page curl control 155, the mapping application of some embodiments presents the other set of controls using different techniques. For instance, in some embodiments, the mapping application presents (e.g., by sliding the other set of controls onto the display screen of the device) the other set of controls when the mapping application receives gesture input (e.g., a swipe gesture) on the device's display screen.

As shown by this stage, the mapping application presents several controls once the mapping application "peels" the page shown in the second stage 110. Among the controls that the mapping application of some embodiments presents after the selection of the page curl control 155 is a set of viewing mode controls that includes is a standard viewing mode control 160 for activating a standard-viewing mode, a hybrid-viewing mode control 165 for activating a hybrid-viewing mode, and a satellite-viewing mode control 170 for activating a satellite-viewing mode.

When the mapping application is in the standard-viewing mode, the mapping application of some embodiments renders map views using non-CCIs (e.g., user-generated textures/images, machine-generated textures/images, etc.). In other words, the mapping application of some such embodiments renders map views without using any CCIs for the standard-viewing mode.

In addition, the third stage 115 illustrates that the user is activating the hybrid-viewing mode. In particular, the user activates the hybrid-viewing mode by selecting (e.g., using a finger to tap) the hybrid-viewing mode control 165, as indicated by a highlighting of the hybrid-viewing mode control 165. When the mapping application receives the selection of the hybrid-viewing mode control 165, the mapping application of some embodiments transitions from rendering the map in the satellite-viewing mode to rendering the map in the hybrid-viewing mode.

In some embodiments, when the mapping application is in the hybrid-viewing mode, the mapping application renders map views using CCIs and map labels. For instance, the mapping application of some embodiments uses the same or a similar technique described above for rendering map views in the satellite-viewing mode (i.e., texture mapping CCIs to the map, map elements, and/or map constructs in the 3D map) and augments such map views with map labels. That is, the mapping application of some such embodiments texture maps CCIs to the map, map elements, and/or map constructs in the 3D map and adds map labels to the map view in order to annotate some or all of the map elements (streets, highways, POIs, cities, states, countries, continents, bodies of water, etc.) in the map view.

Different embodiments of the mapping application render different types of map labels using different techniques. For example, in some embodiments, the mapping application adds polygons that represent map labels (e.g., road indicators) to the 3D map and renders map views of the 3D map with such added polygons. In other words, the mapping application adds map labels to the 3D map before the mapping application renders map views of the 3D map. In other embodiments, the map labels are part of the 3D map (as opposed to adding the map labels to the 3D map) and the mapping application renders the map labels that are to be displayed in the map view. In some such other embodiments, the mapping application ignores the map labels when the mapping application renders map views of the 3D map in the satellite-viewing mode.

Alternatively or in conjunction with adding map labels to the 3D map, the mapping application of some embodiments renders map views in the hybrid-viewing mode by superimposing 2D map labels (e.g., road labels, POI indicators, POI labels, etc.) over rendered map views of the 3D map. That is, in some such embodiments, the mapping application renders a map view of the 3D map (which might include polygons that represent map labels) and then adds 2D map labels to the rendered map view by overlaying the 2D map labels onto the map view.

The fourth stage 120 of FIG. 1 shows the mapping application displaying a map view after the hybrid-viewing mode is activated. As mentioned above, for the hybrid-viewing mode, the mapping application of some embodiments texture maps CCIs to the map, map elements, and/or map constructs in the 3D map and renders a map view of the map that includes map labels (e.g., by rendering the map labels when rendering the map view of the 3D map and/or by superimposing 2D map labels to a rendered map view of the 3D map). As shown, the fourth stage 120 shows the same map view illustrated in the second stage 110 except the map view in the fourth stage 120 also includes various map labels, such as road ribbons that indicate roads in the map view, road labels that indicate the names of the roads, a POI indicator that indicates the location of the POI, and a POI label that indicates the name of the POI.

The examples and embodiments described in this application might show the GUI of the mapping application with the set of UI elements and controls shown in FIG. 1, a different set of UI elements and/or controls, or no such UI elements and/or controls at all. One of ordinary skill in the art will understand that the GUI of the mapping application of some embodiments may include additional and/or different UI elements and/or controls for different modalities of the mapping application (e.g., a map-browsing mode, a location-searching mode, a route-identification mode, a route-navigation mode, etc.). For instance, while in a map-browsing mode, the mapping application of some embodiments includes the UI elements and controls illustrated in FIG. 1 as well as a top bar positioned near the top of device's display screen that includes a direction control for requesting routes along the map from a starting location and an ending location, a search field for searching the location of certain map items (e.g., streets, businesses, points of interest, etc.) in the map, a bookmark control for bookmarking locations of map elements and routes, etc.

In addition, numerous examples and embodiments described in this application illustrate the mapping application in a map-browsing mode. In some embodiments, the mapping application includes several different modalities (e.g., a location-searching mode, a route-identification mode, a route-navigation mode, etc.) for interacting with the map. The mapping application of some embodiments includes a user interface (UI) design that seamlessly and cohesively integrates the controls for each of its different modalities by using a minimum set of on-screen controls that floats on top of the content in order to display as much of the content as possible. Additionally, this cluster adapts to the task at hand, adjusting its contents in an animated fashion when a user moves between the different modalities (e.g., between browsing, searching, routing and navigating). This common element with an adaptive nature enables the mapping application to optimize for different tasks while maintaining a consistent look and interaction model while moving between those tasks.

Several more detailed embodiments of the invention are described in the sections below. Section I conceptually describes details of rendering road indicators in a hybrid-viewing mode of the mapping application of some embodiments. Next, Section II conceptually describes rendering different map labels based on different views of a 3D map according to some embodiments of the invention. Section III describes a software architecture for a mapping application of some embodiments. Next, Section IV describes example electronic systems with which some embodiments of the invention are implemented. Finally, Section V describes a map service operating environment in which some embodiments of the invention operate.

I. Road Indicators for Hybrid-Viewing Mode

As mentioned above, the mapping application of some embodiments renders map labels differently based on different views of the 3D map. For instance, in some embodiments, the mapping application renders road indicators differently based on different perspectives of the 3D map. When rendering road indicators in a map view of the 3D map, the mapping application of some embodiments adjusts the positions of the polygons in the 3D map that represent the road indicators based on the perspective of the map view, before rendering the map view.

Figure 2:
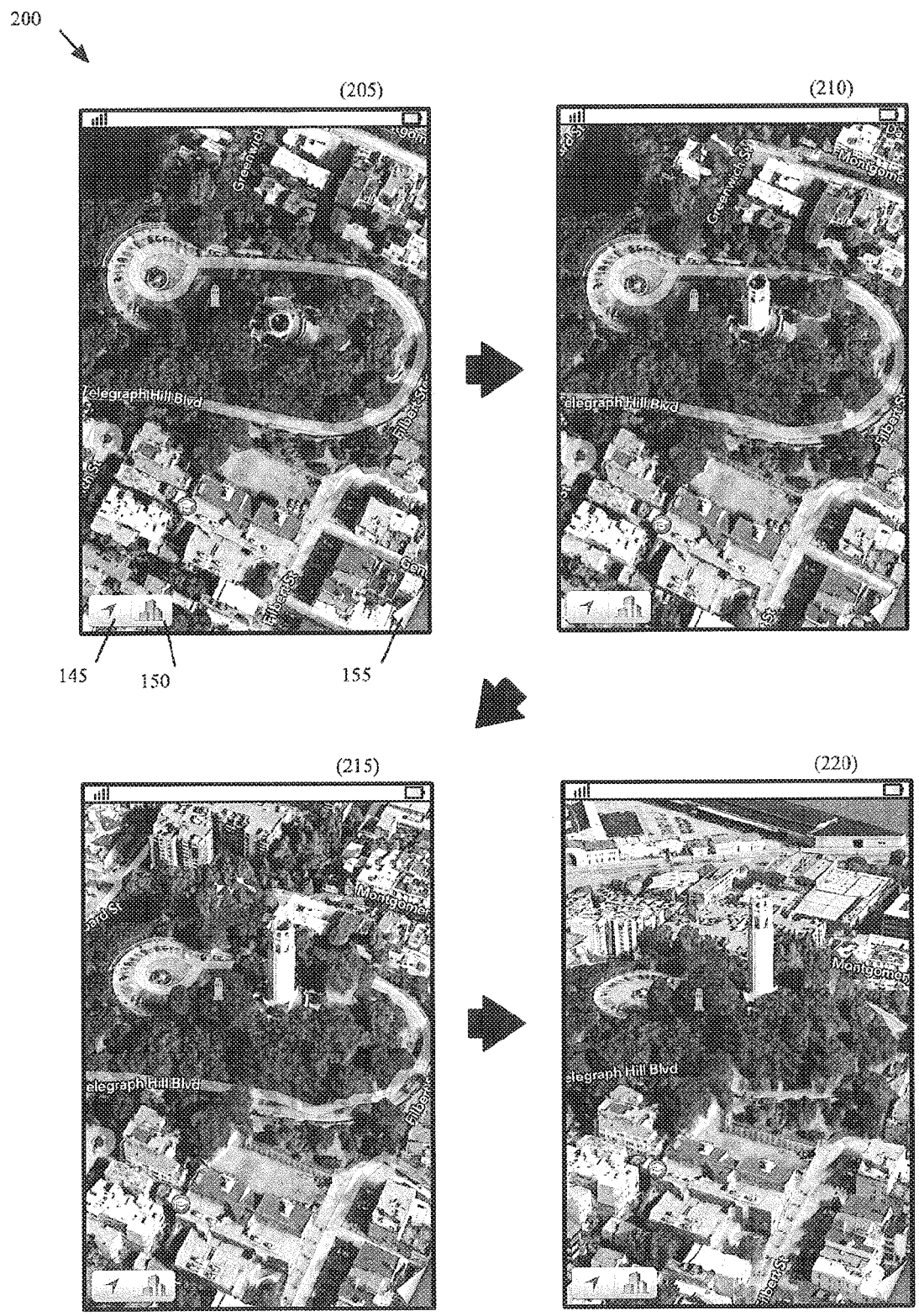
FIG. 2 conceptually illustrates an example of the mapping application of some embodiments rendering road indicators differently based on different perspective views of a 3D map.

FIG. 2 conceptually illustrates an example of the mapping application of some embodiments rendering road indicators differently based on different perspective views of a 3D map. In particular, FIG. 2 illustrates a GUI 200 of the mapping application of some embodiments at four different stages 205-220 that show a road indicator rendered differently based on different perspective views of the 3D map.

The first stage 205 illustrates the mapping application displaying a map view of the 3D map in a hybrid-viewing mode. As described above, when the mapping application is in the hybrid-viewing mode, the mapping application of some embodiments renders a map view by texture mapping CCIs to the map, map elements, and/or map constructs in the 3D map and rendering the map view of the 3D map that includes map labels. As shown in the first stage 205, the map view includes several road labels that indicate names of several roads in the map view and road ribbons that graphically indicate (e.g., by highlighting) the paths of roads in the map view.

As shown, the map view in the first stage 205 is a view of the 3D map from a top-down perspective view (i.e., a 2D view) of the 3D map. When the mapping application of some embodiments renders a top-down perspective view of the 3D map in the hybrid-viewing mode, the mapping application renders the road ribbons over any other map elements in the 3D map by positioning the polygons that represent the road ribbons in the 3D map above any other map elements in the 3D map and then rendering the map view of the 3D map. In this manner, the road ribbons serve as indicators of the paths of roads in the map view for portions of the roads that may be difficult to see and/or obscured by other map elements. For instance, numerous portions of the road labeled "Telegraph Hill Blvd" are obscured by trees in the first stage 205. By rendering the road ribbon for "Telegraph Hill Blvd" over the trees, the mapping application provides a clear indication of the path of the road labeled "Telegraph Hill Blvd".

The second stage 210 illustrates a map view of similar portion of the 3D map as that illustrated in the first stage 205 except the map view in the second stage 210 is a view from lower perspective view of the 3D map compared to the top-down perspective view illustrated in the first stage 205. For this example, a user has adjusted the tilt angle from which the 3D map is viewed in order to view the 3D map from a lower perspective by providing a multi-touch swipe gesture, such as a two-finger swipe gesture in a vertical direction, on a touchscreen of the device on which the mapping application is operating.

When the perspective view of the 3D map is lowered, the mapping application of some embodiments renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map. This way, the road ribbons appear like they naturally belong as part of the 3D map (e.g., the road ribbons do not appear like they float in midair).

The third stage 215 illustrates a map view of a similar portion of the 3D map as that illustrated in the first and second stages 205 and 210 except the map view in the third stage 215 is a view from lower perspective view of the 3D map compared to the perspective view illustrated in the second stage 210. In this example, the user has adjusted the tilt angle from which the 3D map is viewed in order to view the 3D map from a lower perspective by providing a multi-touch swipe gesture, such as a two-finger swipe gesture in a vertical direction, on a touchscreen of the device on which the mapping application is operating.

As mentioned above, in some embodiments, when the perspective view of the 3D map is lowered, the mapping application renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map. As shown, the road ribbons in the third stage 215 appear closer to the corresponding roads in the 3D map compared to the road ribbons illustrated in the second stage 210. For example, the road ribbon for "Telegraph Hill Blvd" in the third stage 215 appears closer to the road for "Telegraph Hill Blvd" compared to the road ribbon for "Telegraph Hill Blvd" illustrated in the second stage 210. This is indicated by the road ribbon for "Telegraph Hill Blvd" in the third stage 215 appearing more undulated as a result of closely following the road for "Telegraph Hill Blvd" and the contours of the trees along the path of the road for "Telegraph Hill Blvd".

In some embodiments, the mapping application does not render road ribbons for roads when the angle (e.g., tilt angle) at which the 3D map is viewed for rendering a map view of the 3D map passes a threshold angle (e.g., a sixty degree tilt angle). The mapping application of some embodiments also begins to fade out the road ribbons in the 3D map when the angle at which the 3D map is viewed for rendering a map view of the 3D map passes another threshold angle (e.g., a fifty degree tilt angle). That is, in some such embodiments, when the mapping application renders map views from an angle of the 3D map that passes a first threshold angle (e.g., a fifty degree tilt angle), the mapping application starts to fade out the road ribbons in the map views, and the mapping application increasingly fades out the road ribbons as the angle of the 3D map from which the mapping application renders map views passes the first threshold angle farther. When the angle of the 3D map from which the mapping application renders map views passes a second threshold angle (e.g., a sixty degree tilt angle), mapping application ignores the road ribbons in the 3D map and stops rendering road ribbons in map views of the 3D map.

The fourth stage 220 illustrates a map view of similar portion of the 3D map as that illustrated in the first, second, and third stages 205-215 except the map view in the fourth stage 220 is a view from lower perspective view of the 3D map compared to the perspective view illustrated in the third stage 215. The user in this example has adjusted the tilt angle from which the 3D map is viewed in order to view the 3D map from a lower perspective by providing a multi-touch swipe gesture, such as a two-finger swipe gesture in a vertical direction, on a touchscreen of the device on which the mapping application is operating.

For this example, the user has adjusted the tilt angle from which the 3D map is viewed past the threshold angle at which the mapping application does not render road ribbons for the map views of the 3D map. As shown in the fourth stage 220, the mapping application rendered map labels for the map view (road labels and POI indicators in this example) other than road ribbons.

Figure 3:
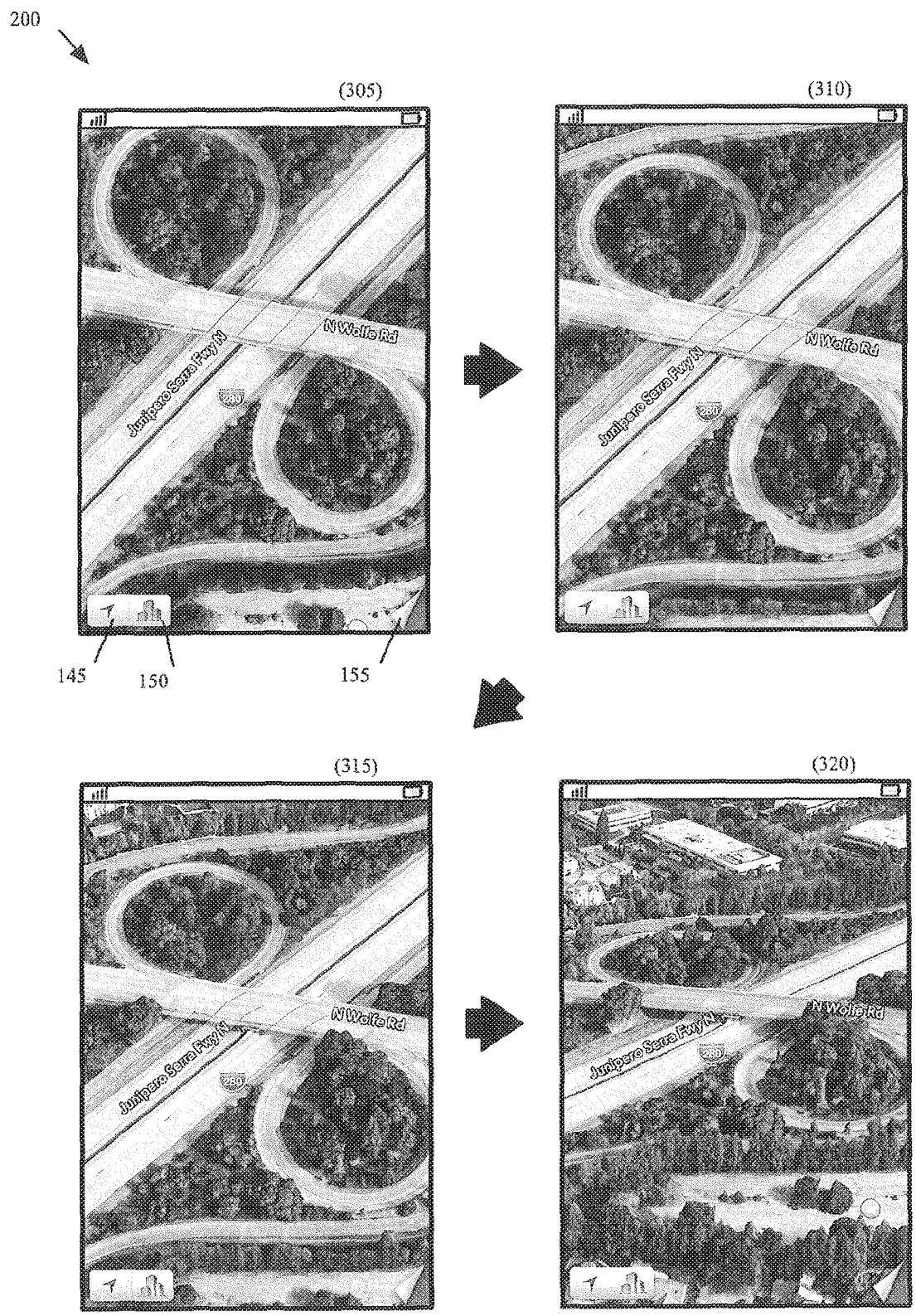
FIG. 3 conceptually illustrates another example of the mapping application of some embodiments rendering road indicators differently based on different perspective views of a 3D map.

FIG. 3 conceptually illustrates another example of the mapping application of some embodiments rendering road indicators differently based on different perspective views of a 3D map. Specifically, FIG. 3 illustrates the GUI 200 of the mapping application of some embodiments at four different stages 305-320 that show a road indicator rendered differently based on different perspective views of the 3D map.

The first stage 305 illustrates the mapping application displaying a map view of the 3D map in a hybrid-viewing mode. In some embodiments, when the mapping application is in the hybrid-viewing mode, the mapping application, as explained above, renders a map view by texture mapping CCIs to the map, map elements, and/or map constructs in the 3D map and rendering the map view of the 3D map that includes map labels. As illustrated in the first stage 305, the map view includes several road labels that indicate names of several roads in the map view and road ribbons that graphically indicate (e.g., by highlighting) the paths of roads in the map view.

As shown, the map view in the first stage 305 is a view of the 3D map from a top-down perspective view (i.e., a 2D view) of the 3D map. In some embodiments, when the mapping application renders a top-down perspective view of the 3D map in the hybrid-viewing mode, the mapping application renders the road ribbons in the same or similar manner as that described above by reference to the first stage 205 of FIG. 2. That is, the mapping application of some embodiments, renders the road ribbons over any other map elements in the 3D map by positioning the polygons that represent the road ribbons in the 3D map above any other map elements in the 3D map and then rendering the map view of the 3D map.

In some instances, such as the example illustrated in FIG. 3, different roads overlap (e.g., an overpass and an underpass) and/or intersect each other. Different embodiments of the mapping application render road ribbons for the different roads overlapping and/or intersecting each other differently. For instance, in some embodiments, the mapping application positions the road ribbons for overlapping and/or intersecting roads by layering the road ribbons in the 3D map based on the type of road to which the road ribbons correspond. Some embodiments define road types to include highways, expressways, arterial roads, collector roads, back roads, etc. For this example, the mapping application layers road ribbons in the 3D map from top to bottom based on the order of the aforementioned road types. As shown, the road ribbons for the highway labeled "Junipero Serra Fwy N" are overlapping the road ribbons for the road labeled "N Wolfe Rd".

The mapping application of some embodiments renders road ribbons such that the road ribbons for different types of roads appear differently. For the example illustrated in FIG. 3, the mapping application renders the road ribbons for highway roads to appear differently than the road ribbons for other types of roads. As shown, the road ribbon for the highway labeled "Junipero Serra Fwy N" is rendered in a translucent yellow color while the road ribbons for the road labeled "N Wolfe Rd" is rendered in a translucent white color. Different appearances are rendered for additional and/or other types of roads in some embodiments.

The second stage 310 illustrates a map view of similar portion of the 3D map as that illustrated in the first stage 305 except the map view in the second stage 310 is a view from lower perspective view of the 3D map compared to the top-down perspective view illustrated in the first stage 305. In this example, a user has adjusted the tilt angle from which the 3D map is viewed in order to view the 3D map from a lower perspective by providing a multi-touch swipe gesture, such as a two-finger swipe gesture in a vertical direction, on a touchscreen of the device on which the mapping application is operating.

As noted above, when the perspective view of the 3D map is lowered, the mapping application renders, in some embodiments, the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map. This way, the road ribbons appear like they naturally belong as part of the 3D map (e.g., the road ribbons do not appear like they float in midair).

The third stage 315 illustrates a map view of a similar portion of the 3D map as that illustrated in the first and second stages 305 and 310 except the map view in the third stage 315 is a view from lower perspective view of the 3D map compared to the perspective view illustrated in the second stage 310. The user in this example has adjusted the tilt angle from which the 3D map is viewed in order view the 3D map from a lower perspective by providing a multi-touch swipe gesture, such as a two-finger swipe gesture in a vertical direction, on a touchscreen of the device on which the mapping application is operating.

When the perspective view of the 3D map is lowered, the mapping application of some embodiments renders, as explained above, the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map.

The fourth stage 320 illustrates a map view of similar portion of the 3D map as that illustrated in the first, second, and third stages 305-315 except the map view in the fourth stage 320 is a view from lower perspective view of the 3D map compared to the perspective view illustrated in the third stage 315. The user in this example has adjusted the tilt angle from which the 3D map is viewed in order to view the 3D map from a lower perspective by providing a multi-touch swipe gesture, such as a two-finger swipe gesture in a vertical direction, on a touchscreen of the device on which the mapping application is operating.

As described above, in some embodiments, the mapping application does not render road ribbons for roads when the angle at which the 3D map is viewed for rendering a map view of the 3D map passes a first threshold angle (e.g., a sixty degree tilt angle) and begins to fade out the road ribbons in the 3D map when the angle at which the 3D map is viewed for rendering a map view of the 3D map passes a second threshold angle. In some embodiments, the mapping application always renders road ribbons for certain types of roads. For example, the mapping application of some embodiments always renders road ribbons for highway roads regardless of the angle at which the 3D map is viewed for rendering a map view of the 3D map.

As shown in the fourth stage 320, the user has adjusted the tilt angle from which the 3D map is viewed past the threshold angle at which the mapping application does not render road ribbons for the map views of the 3D map. As shown in the fourth stage 220, the mapping application rendered road ribbons for the highway labeled "Junipero Serra Fwy N" and does not renderer road ribbons for the road labeled "N Wolfe Rd" nor on ramps to and/or off ramps from the highway labeled "Junipero Serra Fwy N".

Figure 4:
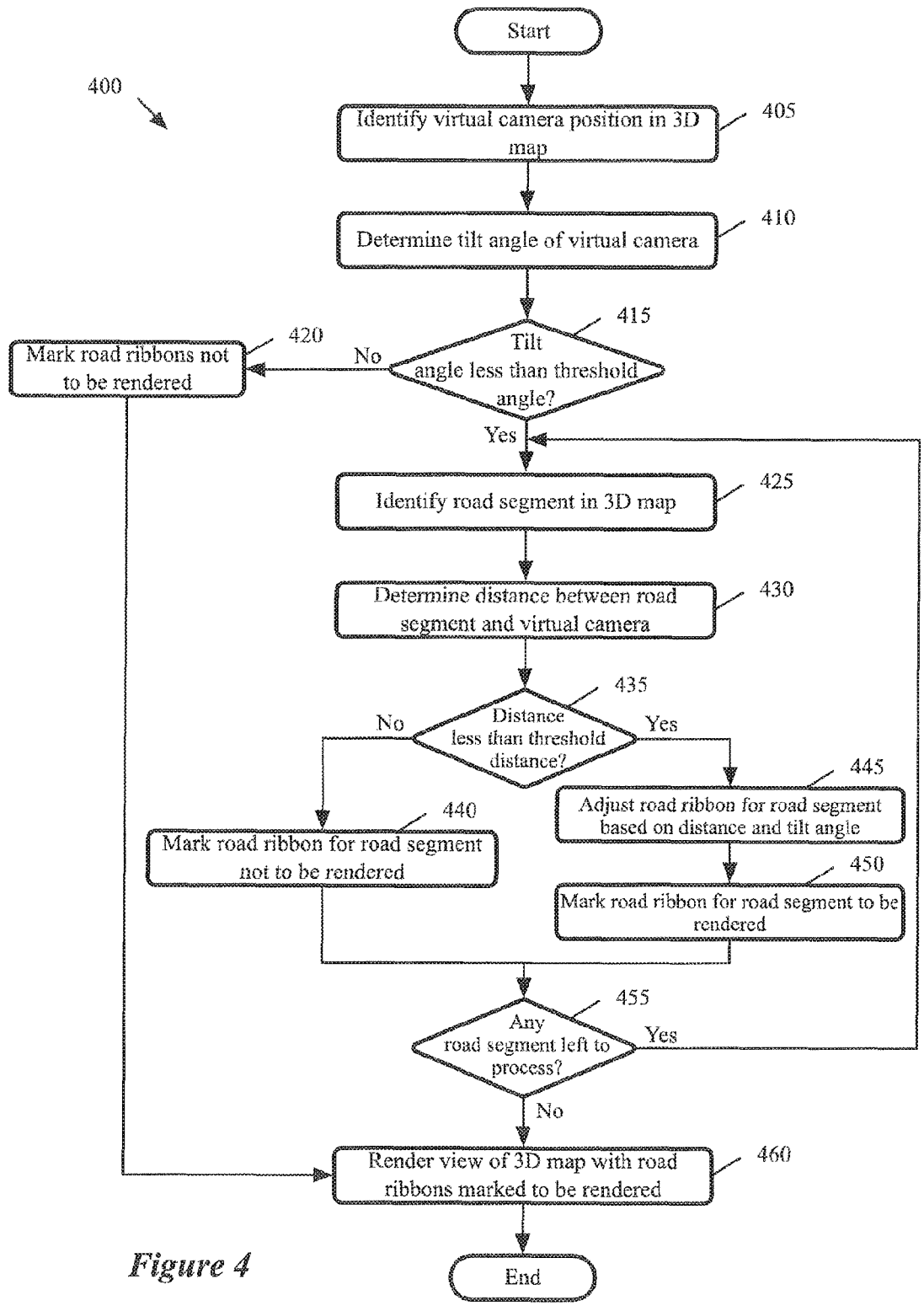
FIG. 4 conceptually illustrates a process of some embodiments for rendering road indicators in a map view of a 3D map.

FIG. 4 conceptually illustrates a process 400 of some embodiments for rendering road indicators in a map view of a 3D map. In some embodiments, the process 400 is performed by the mapping applications described above and below by reference to FIGS. 1-3, 7, and 10 when the mapping application is in a hybrid-viewing mode. The mapping application of some embodiments also performs the process 400 when a user adjusts the tilt angle (e.g., perspective view) from which the 3D map is viewed. In some embodiments, a set of graphics processing units of a device on which the mapping application operates performs the process 400 when the mapping application sends the set of graphics processing units data that describes the virtual camera, the 3D map, road ribbons, etc.

The process 400 starts by identify (at 405) the virtual camera position of a virtual camera in the 3D map. In some embodiments, a virtual camera is a conceptualization of the position and orientation in the 3D map from which the mapping application renders a map view of the 3D map.

Next, the process 400 determines (at 410) the tilt angle of the virtual camera. The tilt angle of the virtual camera is some embodiments is an angle formed by (1) a first vector projected from the virtual camera's point of focus in the 3D map towards the front of the virtual camera (i.e., a vector running along the virtual camera's line of sight) and (2) a second vector projected from the virtual camera's point of focus in the 3D map up along a z-axis of the 3D map that is orthogonal to the x-axis and y-axis of the 3D map.

The process 400 then determines (at 415) whether the tilt angle is less than a threshold angle. When the process 400 determines that the tilt angle is less than the threshold angle, the process 400 marks (at 420) the road ribbons in the 3D map as not to be rendered. In other words, the process 400 ignores the road ribbons in the 3D map for the purpose of rendering map views of the 3D map. In some embodiments, the process 400 marks road ribbons for highway roads (or any other type of road classified as a major road) to be rendered regardless of the tilt angle of the virtual camera (but such road ribbons might not end up being rendered due to the distance between the virtual camera and the road segments and/or 3D map).

The mapping application of some embodiments provides a feature that gradually fades road ribbons as the tilt angle approaches the threshold angle and completely fades out (i.e., not rendered) the road ribbons when the tilt angle passes the threshold angle. In some such embodiments, when the determined tilt angle falls at the lower end of a defined tilt angle range (e.g., 50 degrees in a tilt angle range of 50-60 degrees), the process 400 specifies the road ribbons to be rendered with a small degree of fading. For larger tilt angle values along the defined tilt angle range, the process 400 specifies the road ribbons to be rendered with corresponding larger degrees of fading. In some embodiments, the tilt angle at the higher end of the defined tilt angle range (e.g., 60 degrees in a tilt angle range of 50-60 degrees) is the threshold angle that the process 400 uses at 415. In some embodiments, the process 400 does not specify road ribbons for highway roads (or any other type of road classified as a major road) to be rendered with fading.

When the process 400 determines that the tilt angle is not less than the threshold angle, the process 400 identifies (at 425) a road segment in the 3D map. A road segment, in some embodiments, is a portion of a distinct road in the 3D map. In some embodiments, a road segment does not have any intersecting roads between the beginning and end of the road segment. A distinct road of some embodiments is a road having the same name or several different names identifying the road in the 3D map.

At 430, the process 400 determines the distance between the identified road segment and the virtual camera. In some embodiments, the process 400 determines the distance based on a line that starts from the front of the virtual camera and ends at the midpoint of the road segment.

The process 400 then determines (at 435) whether the determined distance is less than a threshold distance. When the process 400 determines that the determined distance is not less than the threshold distance, the process 400 marks (at 440) the road ribbon for the identified road segment as not to be rendered and then proceeds to 455.

When the process 400 determines that the determined distance is less than the threshold distance, the process 400 adjusts (at 445) the polygon that represents the road ribbon mesh in the 3D map for the identified road segment based on the determined distance and tilt angle of the virtual camera. As mentioned above, in some embodiments, when the mapping application renders a top-down perspective view of the 3D map in the hybrid-viewing mode, the mapping application renders the road ribbons over any other map elements in the 3D map by positioning the polygons that represent the road ribbons in the 3D map above any other map elements in the 3D map. When the perspective view of the 3D map is lowered, the mapping application of some embodiments renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map. After adjusting the road ribbon, the process 400 marks (at 450) the road ribbon for the identified road segment as to be rendered and then proceeds to 455.

To adjust the height of the polygon for the road ribbon, the process 400 of some embodiments uses a heightfield of the 3D map (e.g., which is generated and/or stored by a map service in some embodiments). In some embodiments, the heightfield is represented by a raster image in which height information for the 3D is encoded. For instance, a black value for a pixel in the raster image represents a height of zero for a point in the map that corresponds to pixel, a white value for the pixel represents a maximum height, and increasing lighter gray values represent corresponding larger height values between zero and the maximum height value. The heightfield is referred to as a 2.5D image representation of the terrain of the 3D map because the heightfield represents a 3D shape, but does not truly define a true 3D shape. The process 400 adjusts the polygon for the road ribbon by identifying the pixels in the raster image that correspond to the points of the polygon and adjusting the heights of the points of the polygon in the 3D map according to the values of the corresponding pixels. In this manner, the process 400 is able to quickly determine the elevation of the terrain in the 3D map without having to sample the geometry of the 3D map, which is computationally more expensive to determine.

In some embodiments, the process 400 also adjusts the polygon that represent the road ribbon by moving the polygon towards the virtual camera based on the determined tilt angle. For larger determined tilt angles, the polygon is moved towards the virtual camera a larger distance and the polygon is moved towards the virtual camera a smaller distance for smaller determined tilt angles. In some embodiments, the process 400 moves the polygon towards the virtual camera in a projective correct manner that maintains the perspective of the road ribbon (i.e., the perspective of the road ribbon does not appear to change). In other words, the process 400 moves the polygon of the road ribbon towards the virtual camera in a way that when the road ribbon is rendered, the road ribbon does not appear to move other than the visible change in the vertical height/depth of the road ribbon.

At 455, the process 400 determines whether any road segment is left to process. When the process 400 determines that a road segment is left to process, the process 400 returns to 425 to continue processing any remaining road segments. Otherwise, the process 400 renders (at 460) a view of the 3D map with the road ribbons marked to be rendered and then the process 400 ends. The process 400 of some embodiments renders the view of the 3D map based on the position of the virtual camera in the 3D map.

In some embodiments, before the process 400 renders the view of the 3D, the process 400 performs culling operations that potentially could eliminate one or more road ribbon that are marked to be rendered, from being rendered. For instance, in some embodiments, the process 400 determines whether a road label is occluded by map elements and/or constructs in the 3D map based on the position and orientation of the virtual camera in the 3D map. The process 400 of some embodiments determines that a road label is occluded when a line segment having a defined length and vertically projected through the center of the road label along the z-axis of the 3D, is occluded by map elements and/or map constructs in the 3D map. In such instances, the process 400 of some embodiments eliminates (i.e., marks not to be rendered) the road ribbon for the road segment to which the road label corresponds from being rendered.

While FIG. 4 illustrates determining whether to render a road ribbon for a particular road segment based on the distance from the virtual camera to the particular road segment, the mapping application of some embodiments uses the distance from the virtual camera to the 3D map to determine whether to render road ribbons for all road segments. In some such embodiments, the mapping application determines the distance based on a line that starts from the front of the virtual camera, runs perpendicular to the 3D map (i.e., along the z-axis of the 3D map), and ends at a point that intersects the base of the 3D map (i.e., a point having a z-axis value of 0). In other such embodiments, the mapping application determines the distance based on a line that starts from the front of the virtual camera used to identify the position in the 3D map from which the mapping application renders the view of the 3D map and ends at the virtual camera's point of focus in the 3D map (i.e., a line running along the virtual camera's line of sight).

Figure 5:
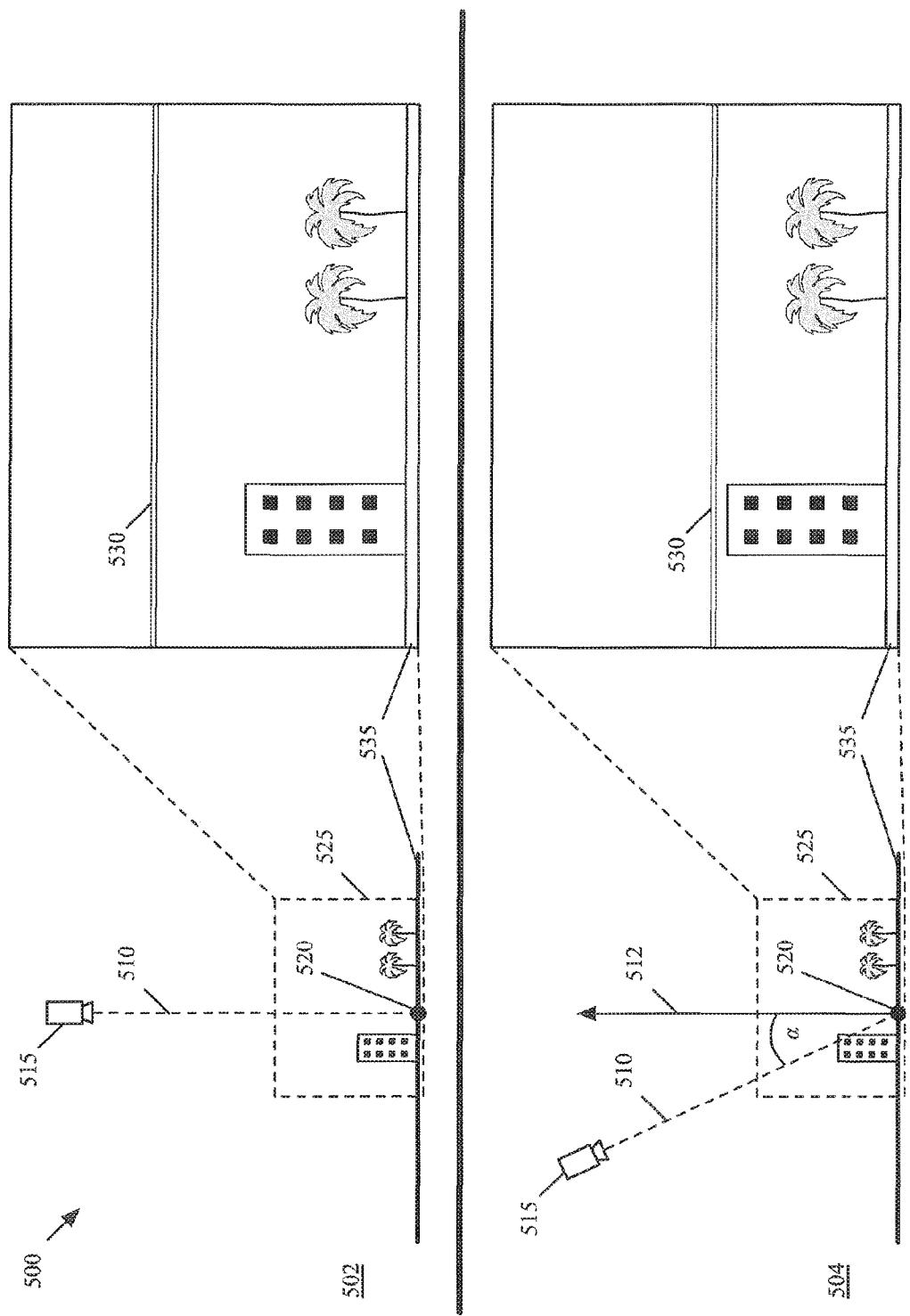
FIGS. 5 and 6 conceptually illustrate examples of different positions of a virtual camera in a 3D map and corresponding positions of a road indicator in the 3D map according to some embodiments of the invention.
Figure 6:
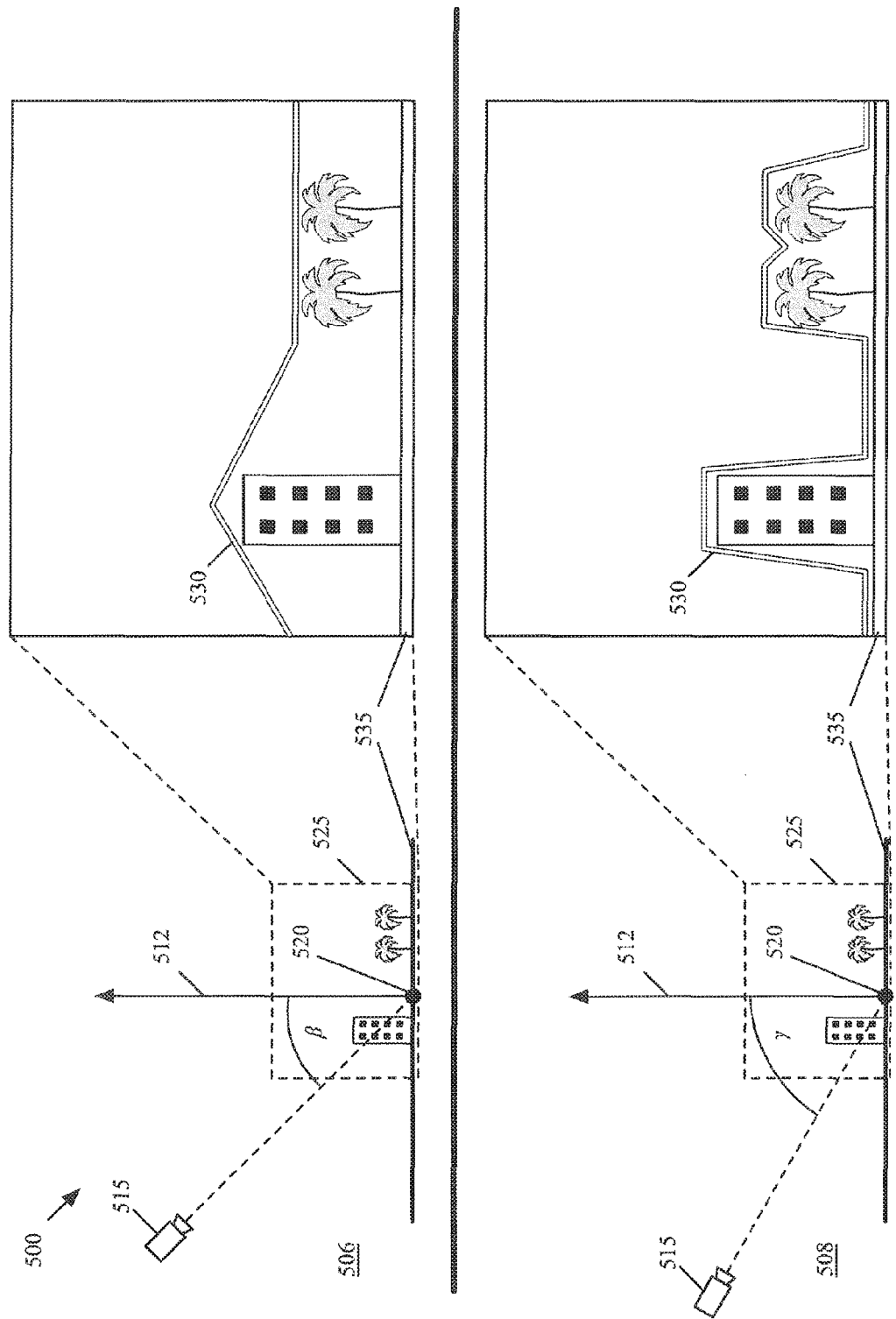

FIGS. 5 and 6 conceptually illustrate examples of different positions of a virtual camera 515 in a 3D map 500 and corresponding positions of a road ribbon 530 in the 3D map according to some embodiments of the invention. Specifically, FIGS. 5 and 6 illustrate the 3D map 500 at four different stages 502-508 that show a side view of positions of the virtual camera 515 in the 3D map 500 at increasingly lower perspective views of the 3D map 500 and the corresponding positions of the road ribbon 530. As shown, the 3D map 500 includes a building and two trees along a road 535.

The first stage 502 illustrated in FIG. 5 shows the virtual camera 515 positioned in a top-down view of the 3D map 500. In particular, a line 518 from the front of the virtual camera 515 and the virtual camera 515's point of focus 520 in the 3D map 500 (i.e., a line that runs along the virtual camera 515's line of sight) is parallel to the z-axis of the 3D map 500.

As described above by reference to FIG. 2, when the mapping application renders a top-down perspective view of the 3D map in the hybrid-viewing mode, the mapping application of some embodiments renders the road ribbons over any other map elements in the 3D map by positioning the polygons that represent the road ribbons in the 3D map above any other map elements in the 3D map and then rendering the map view of the 3D map.

As shown in an exploded view 525 of the 3D map 500 of the first stage 502, the mapping application in this example positioned a polygon 530 that represents a road ribbon for the road 535 above the building and trees for rendering a map view of the 3D map 500 from the top-down perspective of the virtual camera 515. Because the virtual camera 515 is positioned in a top-down view of the 3D map 500, the height of the road ribbon represented by the polygon 530 is not perceivable when rendering a map view of the 3D map 500 from the position of the virtual camera 515. As such, the mapping application is able to position the polygon 530 high in the 3D map 500 in order to ensure that the polygon 530 is positioned above any map elements in the 3D map 500.

As illustrated in FIG. 5, the second stage 504 shows the virtual camera 515 positioned at a lower perspective view of the 3D map 500 compared to the position of the virtual camera 515 illustrated in the first stage 502. Specifically, the virtual camera 515 maintains the same point of focus 520 in the 3D map 500 while the virtual camera 515 increases its tilt angle to an angle α. In the second stage 504, the angle α is formed by (1) a vector 512 projected from the virtual camera's point of focus 520 in the 3D map 500 up along the z-axis of the 3D map 500 that is orthogonal to the x-axis and y-axis of the 3D map 500 and (2) a line that starts from the front of the virtual camera 515 and ends at the virtual camera 515's point of focus 520 (i.e., a line that runs along the virtual camera's line of sight).

As mentioned above, when the perspective view of the 3D map is lowered, the mapping application of some embodiments renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map.

As shown in the exploded view 525 of the 3D map 500 of the second stage 504, the mapping application for this example lowered the polygon 530 in the 3D map 500 in order to move the polygon 530 closer to the road 535 for rendering a map view of the 3D map 500 from the perspective view of the virtual camera 515. Since the virtual camera 515 is viewing the 3D map 500 from a perspective view, the mapping application positioned the polygon 530 closer to the road 535 in the 3D map 500 so that the road ribbon appears like it naturally belongs as part of the 3D map 500 and not like the road ribbon is floating in midair.

In the third stage 506 illustrated in FIG. 6, the virtual camera 515 is positioned at a lower perspective view of the 3D map 500 compared to the position of the virtual camera 515 illustrated in the second stage 504. As shown, the virtual camera 515 maintains the same point of focus 520 in the 3D map 500 while the virtual camera 515 increases its tilt angle to an angle β. In the third stage 506, the angle β is formed by (1) a vector 512 projected from the virtual camera's point of focus 520 in the 3D map 500 up along the z-axis of the 3D map 500 that is orthogonal to the x-axis and y-axis of the 3D map 500 and (2) a line that starts from the front of the virtual camera 515 and ends at the virtual camera 515's point of focus 520 (i.e., a line that runs along the virtual camera's line of sight).

As previously explained, when the perspective view of the 3D map is lowered, the mapping application of some embodiments renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map.

As shown in the exploded view 525 of the 3D map 500 of the third stage 506, in this example, the mapping application lowered the polygon 530 in the 3D map 500 in order to move the polygon 530 closer to the road 535 for rendering a map view of the 3D map 500 from the perspective view of the virtual camera 515. In order to maintain the polygon 530 above the map elements in the 3D map 500, the mapping application adjusted the polygon 530 to follow the contours of the building and the trees in the exploded view 525 of the 3D map 500.

The fourth stage 508 shown in FIG. 6 illustrates the virtual camera 515 positioned at a lower perspective view of the 3D map 500 compared to the position of the virtual camera 515 illustrated in the third stage 506. The virtual camera 515 in the fourth stage 508 maintains the same point of focus 520 in the 3D map 500 while the virtual camera 515 increases its tilt angle to an angle γ. In the fourth stage 508, the angle γ is formed by (1) a vector 512 projected from the virtual camera's point of focus 520 in the 3D map 500 up along the z-axis of the 3D map 500 that is orthogonal to the x-axis and y-axis of the 3D map 500 and (2) a line that starts from the front of the virtual camera 515 and ends at the virtual camera 515's point of focus 520 (i.e., a line that runs along the virtual camera's line of sight).

As noted above, in some embodiments, when the perspective view of the 3D map is lowered, the mapping application renders the map view from the new (lower) perspective by positioning the polygons that represent the road ribbons in the 3D map closer towards the corresponding roads in the 3D map (e.g., by decreasing the distance between of the road ribbons and the roads along the z-axis of the 3D map) while maintaining the road ribbon polygons above map elements in the 3D map, and then rendering the map view of the 3D map.

As shown in the exploded view 525 of the 3D map 500 of the fourth stage 508, the mapping application in this example lowered the polygon 530 in the 3D map 500 in order to move the polygon 530 closer to the road 535 for rendering a map view of the 3D map 500 from the perspective view of the virtual camera 515. To maintain the polygon 530 above the map elements in the 3D map 500, the mapping application adjusted the polygon 530 to more closely follow the contours of the building and the trees in the exploded view 525 of the 3D map 500 compared to the position of the polygon 530 illustrated in the third stage 506.

II. Different Map Labels Based on Different Views of Map

As noted above, in some embodiments, the mapping application renders different map labels based on different views of the 3D map. For example, the mapping application of some embodiments renders different map labels based on different distances (e.g., zoom levels) from the 3D map. In some embodiments, the mapping application renders road indicators for streets when rendering map views of the 3D map at close distances (e.g., high zoom levels), renders road indicators for highways when rendering map views of the 3D map at medium distances (e.g., medium zoom levels), and does not render any road indicators when rendering map views of the 3D map at far distances (e.g., low zoom levels).

Figure 7:
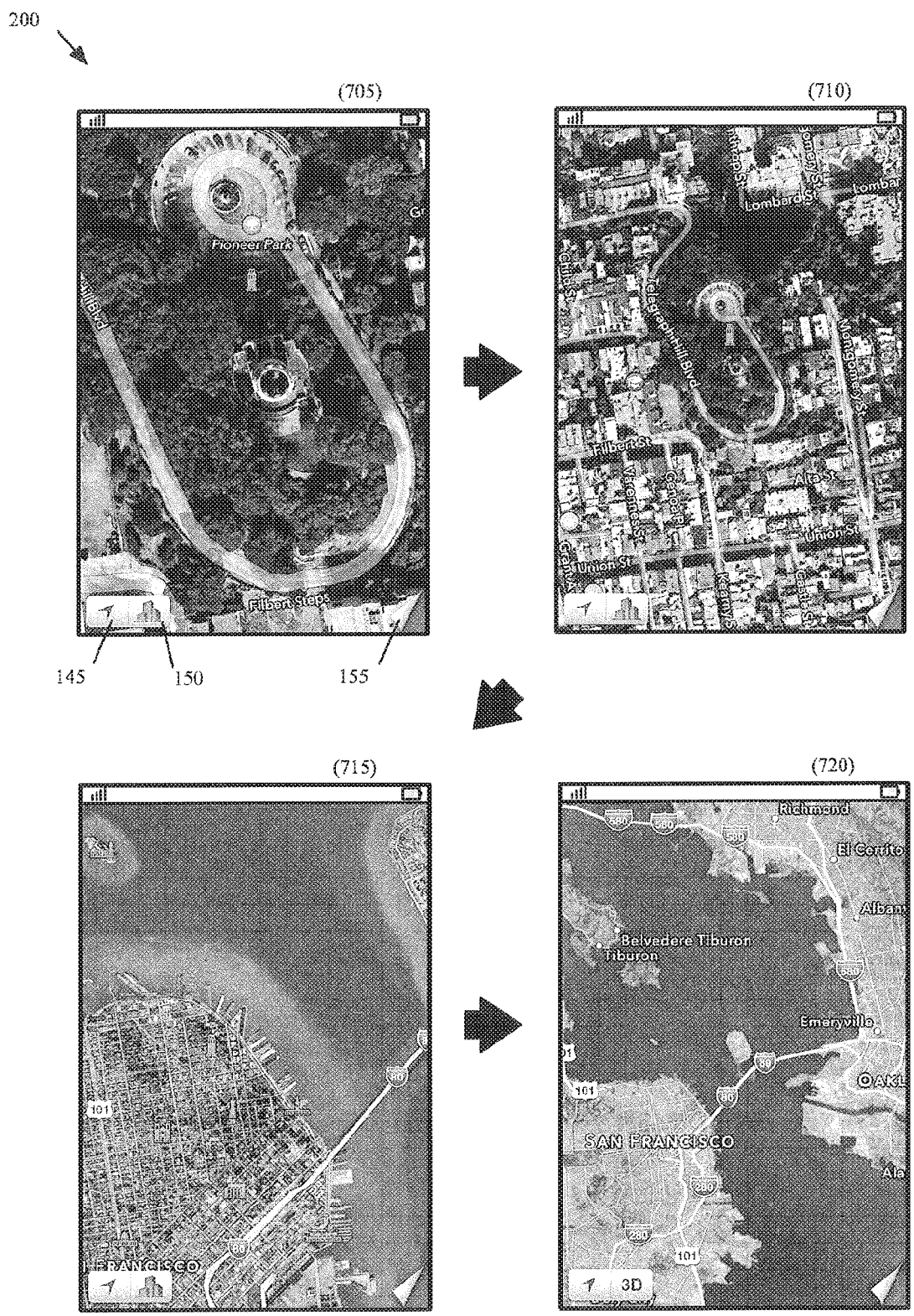
FIG. 7 conceptually illustrates an example of the mapping application of some embodiments rendering different map labels based on different distances from a 3D map.

FIG. 7 conceptually illustrates an example of the mapping application of some embodiments rendering different map labels based on different distances from a 3D map. Specifically, FIG. 7 illustrates the GUI 200 of the mapping application of some embodiments at four different stages 705-720 that show different map labels rendered based on views of the 3D map from different distances.

The first stage 705 illustrates the mapping application displaying a map view of the 3D map in a hybrid-viewing mode. As described above, when the mapping application is in the hybrid-viewing mode, the mapping application of some embodiments renders a map view by texture mapping CCIs to the map, map elements, and/or map constructs in the 3D map and rendering the map view of the 3D map that includes map labels. As shown in the first stage 705, the map view includes several road labels that indicate names of several roads in the map view, road ribbons that graphically indicate (e.g., by highlighting) the paths of roads in the map view, a POI indicator that indicates the location of the POI, and a POI label that indicates the name of the POI.

For a particular type of map label, the mapping application of some embodiments renders map labels for the particular type of map label only when the mapping application renders map views from a defined range of distances from the 3D map (e.g., zoom levels). For instance, the mapping application of some embodiments renders POI indicators when rendering from a first defined range of distances from the 3D map, renders POI labels when rendering from a second defined range of distances from the 3D map, renders road ribbons when rendering from a third defined range of distances from the 3D map, renders road labels when rendering from a fourth defined range of distances from the 3D map, renders city labels when rendering from a fifth defined range of distances from the 3D map, renders city indicators when rendering from a sixth defined range of distances from the 3D map, renders state labels when rendering from a seventh defined range of distances from the 3D map, etc. In some embodiments, the defined ranges of distances for different types of map labels do not overlap, partially overlap, completely overlap, or are the same.

Alternatively, or in conjunction, the mapping application of some embodiments renders, road ribbons for a particular type of road only when the mapping application renders map views from a defined range of distances from the 3D map (e.g., zoom levels). For instance, the mapping application of some embodiments renders road ribbons for back roads when rendering from a first defined range of distances from the 3D map, renders road ribbons for collector roads when rendering from a second defined range of distances from the 3D map, renders road ribbons for arterial roads when rendering from a third defined range of distances from the 3D map, renders road ribbons for highways when rendering from a fourth defined range of distances from the 3D map, etc. These defined ranges of distances for different types of roads do not overlap, partially overlap, completely overlap, or are the same, in some embodiments, In some embodiments, the mapping application determines the distance from the 3D map based on a line that starts from the front of the virtual camera used to identify the position in the 3D map from which the mapping application renders the view of the 3D map, runs perpendicular to the 3D map (i.e., along the z-axis of the 3D map), and ends at a point that intersects the base of the 3D map (i.e., a point having a z-axis value of 0). In other embodiments, the mapping application determines the distance from the 3D map based on a line that starts from the front of the virtual camera used to identify the position in the 3D map from which the mapping application renders the view of the 3D map and ends at the virtual camera's point of focus in the 3D map (i.e., a line running along the virtual camera's line of sight).

The second stage 710 illustrates a map view of similar portion of the 3D map as that illustrated in the first stage 705 except the map view in the second stage 710 is a view from a farther distances from the 3D map (e.g., lower zoom level) compared to the view illustrated in the first stage 705. For this example, a user has adjusted the distance from which to view the 3D map in order to view the 3D map from a farther distance by providing a multi-touch gesture, such as a two-finger pinch gesture, on a touchscreen of the device on which the mapping application is operating. As shown, the mapping application in the second stage 710 rendered map labels only for POI indicators, road ribbons, and road labels.

The third stage 715 illustrates a map view of a similar portion of the 3D map as that illustrated in the first and second stages 705 and 710 except the map view in the third stage 715 is a view from a farther distance from the 3D map (e.g., lower zoom level) compared to the view illustrated in the second stage 710. In this example, the user has adjusted the distance from which to view the 3D map in order to view the 3D map from a farther distance by providing a multi-touch gesture, such as a two-finger pinch gesture, on a touchscreen of the device on which the mapping application is operating. For the map view illustrated in the third stage 715, the mapping application rendered map labels only for city labels, POI indicators, road ribbons for several types of roads (e.g., highway roads, arterial roads, and collector roads), and road labels for highway roads (highway shields in this example).

The fourth stage 720 illustrates a map view of similar portion of the 3D map as that illustrated in the first, second, and third stages 705-715 except the map view in the fourth stage 720 is a view from a farther distance from the 3D map compared to the view illustrated in the third stage 715. The user in this example has adjusted the distance from which to view the 3D map in order to view the 3D map from a farther distance by providing a multi-touch gesture, such as a two-finger pinch gesture, on a touchscreen of the device on which the mapping application is operating. As shown, the mapping application rendered map labels only for city labels, city indicators (small circles/dots in this example), road ribbons for several types of roads (e.g., highway roads and arterial roads), and road labels for highway roads (highway shields in this example).

Figure 8:
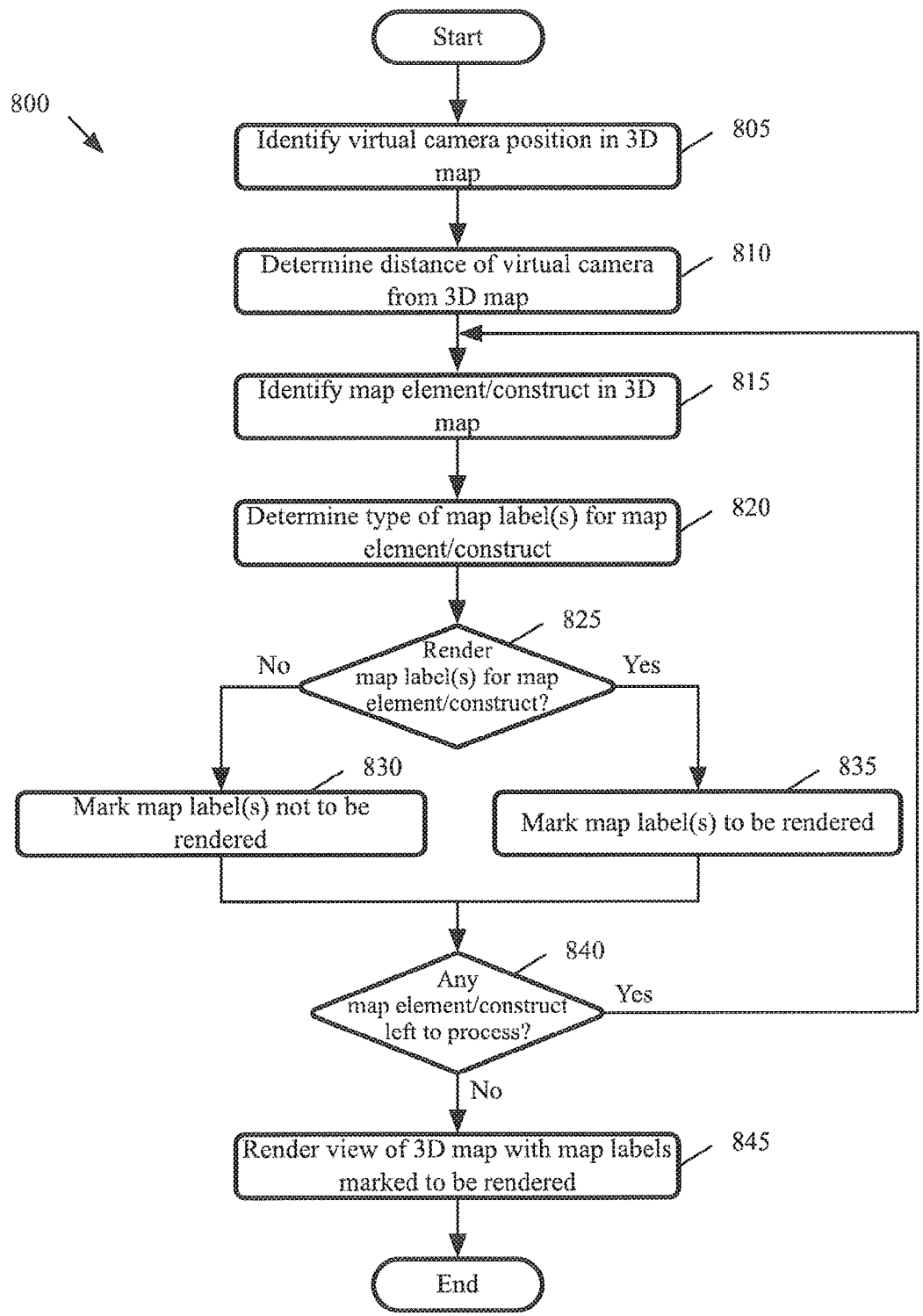
FIG. 8 conceptually illustrates a process of some embodiments for rendering different map labels based on different distances from a 3D map.

FIG. 8 conceptually illustrates a process 800 of some embodiments for rendering different map labels based on different distances from a 3D map. In some embodiments, the process 800 is performed by the mapping applications described above and below by reference to FIGS. 1-3, 7, and 10 when the mapping application is in a hybrid-viewing mode. The mapping application of some embodiments also performs the process 800 when a user adjusts the distance from the 3D map from which the 3D map is viewed. In some embodiments, a set of graphics processing units of a device on which the mapping application operates performs the process 800 when the mapping application sends the set of graphics processing units data that describes the virtual camera, the 3D map, map labels, etc.

The process 800 starts by identify (at 805) the virtual camera position of a virtual camera in the 3D map. As noted above, a virtual camera of some embodiments is a conceptualization of the position in the 3D map from which the mapping application renders a map view of the 3D map.

Next, the process 800 determines (at 810) the distance of the virtual camera from the 3D map. In some embodiments, the process 800 determines the distance of the virtual camera from the 3D map based on a line that starts from the front of the virtual camera, runs perpendicular to the 3D map (i.e., along the z-axis of the 3D map), and ends at a point that intersects the base of the 3D map (i.e., a point having a z-axis value of 0). In other embodiments, the process 800 determines the distance from the 3D map based on a line that starts from the front of the virtual camera and ends at the virtual camera's point of focus in the 3D map (i.e., a line running along the virtual camera's line of sight).

The process 800 then identifies (at 815) a map element or map construct in the 3D map. In some embodiments, a map element and/or construct in the 3D map includes streets, highways, POIs, cities, states, countries, continents, bodies of water, etc. Next, the process 800 determines (at 820) the type of map label(s) the distance between the identified road segment and the virtual camera. In some embodiments, the process 800 determines the distance based on a line that starts from the front of the virtual camera and ends at the midpoint of the road segment.

After determining the type of map labels for the map element or map construct, the process 800 determines (at 825) whether to render the map label(s) for the map element or map construct. In some embodiments, the process 800 determines this based on the determined distance and the determined map label type of the map label(s). As noted above, for a particular type of map label, some embodiments render map labels for the particular type of map label only when rendering map views from a defined range of distances from the 3D map (e.g., zoom levels). Alternatively, or in conjunction, the some embodiments render road ribbons for a particular type of road only when rendering map views from a defined range of distances from the 3D map (e.g., zoom levels). The process 800 of some such embodiments uses a style sheet (e.g., stored at the device on which the mapping application operates or received from a map service) that specifies whether to render a particular map label according to a distance from the 3D map and the map label type of the particular map label.

When the process 800 determines not to render the map label(s) for the map element or map construct, the process 800 marks (at 830) the map label(s) as not to be rendered and then proceeds to 840. Otherwise, the process 800 marks (at 835) the map label(s) as to be rendered and then proceeds to 840.

At 840, the process 800 determines whether any map element or map construct is left to process. When the process 800 determines that a map element or map construct is left to process, the process 800 returns to 815 to continue processing any remaining map elements and/or map constructs. Otherwise, the process 800 renders (at 845) a view of the 3D map with the map labels marked to be rendered and then the process 800 ends.

In some embodiments, the mapping application allows a user to specify a location in a 3D map with a graphical location indicator (e.g., a pin). The user may use the location in any number of different ways. For instance, the mapping application allows the user to generate route navigations or navigation instructions from the specified location to another location in the 3D map or from the other location in the 3D map to the specified location. In some embodiments, the mapping application allows the user to share the specified location with others.

Figure 9:
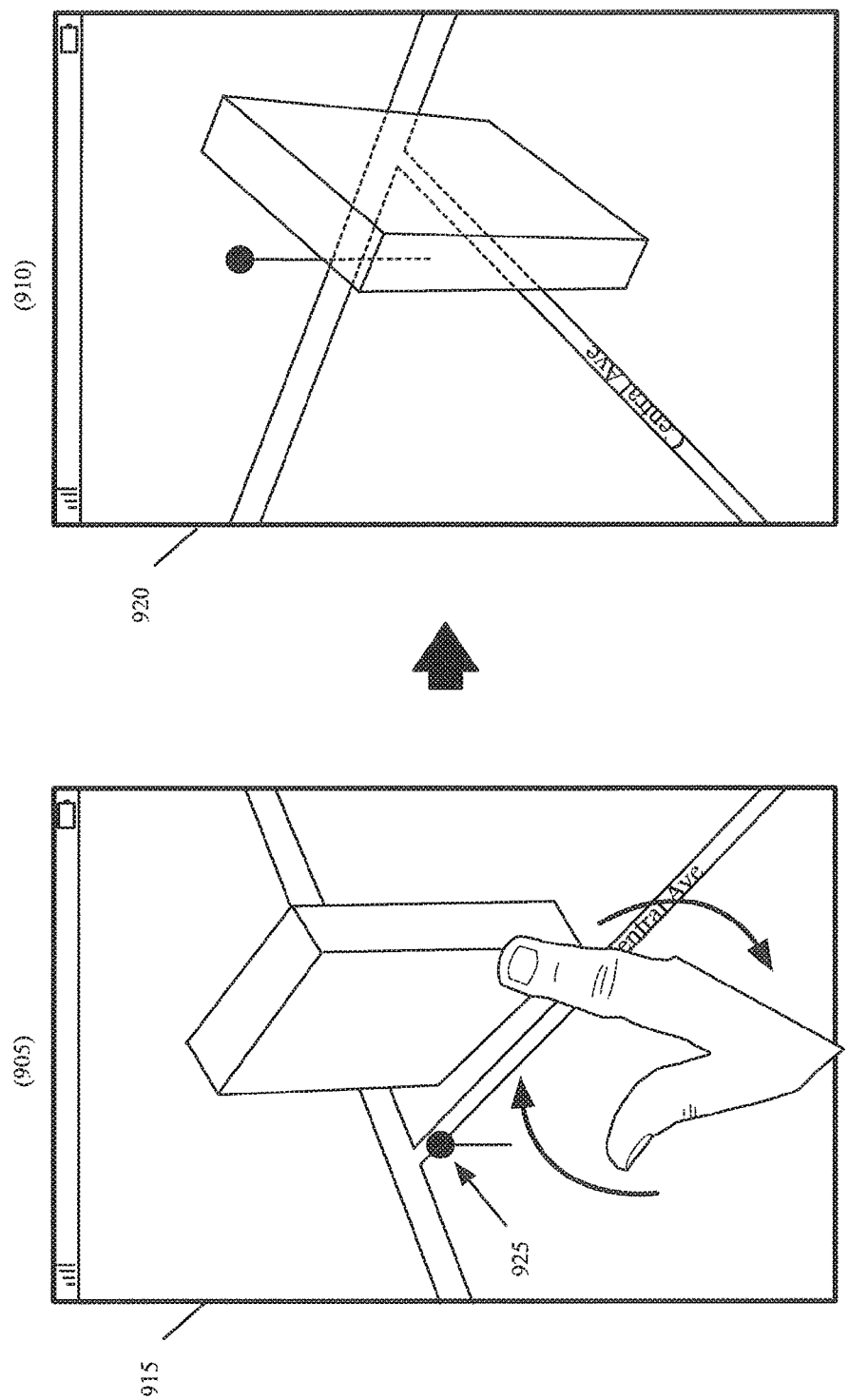
FIG. 9 conceptually illustrates a feature provided by the mapping application of some embodiments for rendering graphical location indicators in a 3D map.

FIG. 9 conceptually illustrates a feature provided by the mapping application of some embodiments for rendering graphical location indicators in a 3D map. In particular, FIG. 9 illustrates the mapping application of some embodiments at two stages 905-910 of displaying different views of a 3D map that are rendered with a graphical location indicator 925.

The first stage 905 illustrates a view of the 3D map 915. As shown, the map view 915 includes several roads, a building, and the graphical location indicator 925 (e.g., a pin) positioned at a location specified by a user. In some embodiments, the user specifies the location by using a finger to tap the location displayed on a touchscreen of a device on which the mapping application is operating and holding the finger on the touchscreen for a defined amount of time. When the mapping application receives this input, the mapping application of some embodiments displays the graphical location indicator 925 at the location in the 3D map that the user specified.

The first stage 905 also illustrates the user performing a rotate operation in order to rotate the view of the map 915. The user in this example is providing a multi-touch gesture by placing two fingers on a touchscreen of the device on which the mapping application is operating and rotating the two fingers in a clockwise direction about a location on the touchscreen (e.g., a midpoint between an initial pair of points where the two fingers touch the touchscreen) in order to rotate the map view 915 in a clockwise direction. Upon receiving this input to rotate the map view, the mapping application of some embodiments rotates the 3D map to another view of the 3D map.

The second stage 910 illustrates a view of the 3D map 920 after the mapping application has been rotated 3D map. In some embodiments, the mapping application determines whether a graphical location indicator is occluded by elements in the 3D map when the mapping application renders a view of the 3D map. If the graphical location indicator is occluded, the mapping application of some embodiments modifies the graphical location indicator so that it extends above the elements in the 3D map that might otherwise occlude the graphical location indicator. As shown, the mapping application in this example has modified the graphical location indicator 925 by extending the pinhead of the graphical location indicator 925 upwards so that the building in the map view 920 does not occlude the graphical location indicator 925 and the pinhead of the graphical location indicator 925 is visible.

While FIG. 9 shows an example of modifying user-specified graphical location indicators for rendering in a 3D map, the mapping application of some embodiments performs the same or similar modification for other map labels. For instance, in some embodiments, the mapping application modifies POI indicators in the same or similar manner.

III. Software Architecture

Figure 10:
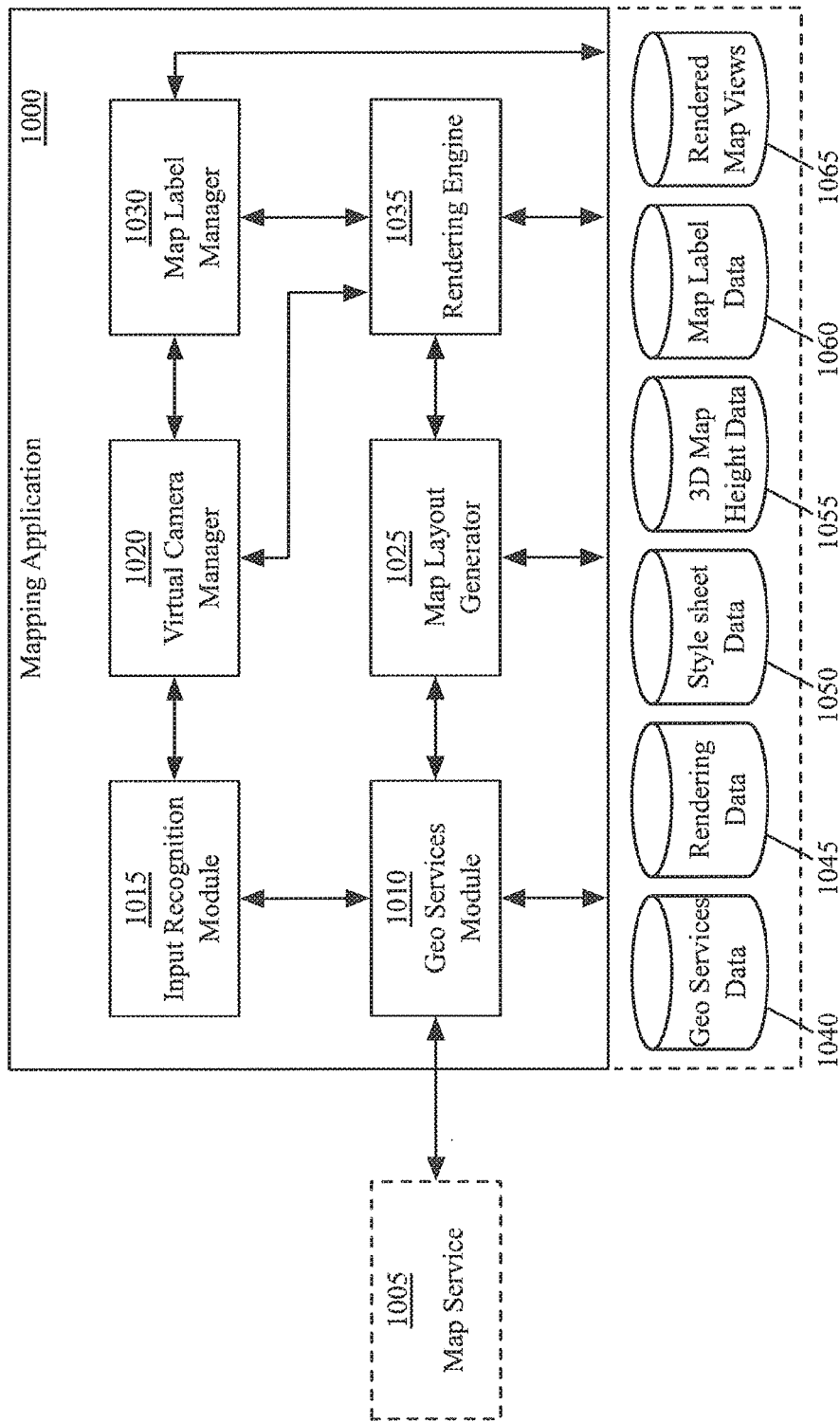
FIG. 10 conceptually illustrates a software architecture of a mapping application of some embodiments.

In some embodiments, the processes described above are implemented as software running on a particular machine, such as a computer (e.g., a desktop, laptop, etc.), a handheld device (e.g., a smartphone), or a tablet computing device, or stored in a machine readable medium. FIG. 10 conceptually illustrates a software architecture of a mapping application 1000 of some embodiments. In some embodiments, the mapping application 1000 is a stand-alone application (e.g., Maps®, provided by Apple Inc.) for browsing a map, searching locations in the map, identifying routes in the map, providing navigation routes in the map, etc.

The mapping application 1000 of some embodiments is integrated into another application while in other embodiments the mapping application 1000 might be implemented within an operating system (e.g., iOS®, provided by Apple Inc.). Furthermore, in some embodiments, the mapping application 1000 is provided as part of a server-based solution. In some such embodiments, the mapping application 1000 is provided via a thin client. That is, the mapping application 1000 runs on a server while a user interacts with the mapping application 1000 via a separate machine remote from the server. In other such embodiments, the mapping application 1000 is provided as a thick client. That is, the mapping application 1000 is distributed from the server to the client machine and runs on the client machine.

As shown, the mapping application 1000 includes a geo services module 1010, an input recognition module 1015, a virtual camera manager 1020, a map layout generator 1025, a map label manager 1030, and a rendering engine 1035. The mapping application 1000 also includes geo services data storage 1040, rendering data storage 1045, style sheet data storage 1050, 3D map height data storage 1055, map label data storage 1060, and rendered map views storage 1065.

In some embodiments, the geo services data storage 1040 stores geographic data (also referred to as geodata or geo data). The geographic data of some embodiments includes data that represents objects (e.g., roads, buildings, landcover, foliage and/or vegetation, waterways, etc.) in the real world. The data that represents the objects in the real world includes in some embodiments vector data (e.g., points, lines, polygons, etc.), raster data (e.g., CCIs), or a combination of both vector and raster data.

The rendering data storage 1045 stores data for rendering map views. In some embodiments the rendering data includes texture data, color data, shadow data, shader data, etc. In some embodiments, the style sheet data storage 1050 stores stylesheet data that specifies the rendering parameters (e.g., textures, colors, shadows, shaders, etc.) to use for rendering different map elements and/or constructs and map labels with different appearances in the map view.

The 3D map height data storage 1055 of some embodiments stores heightfields for 3D maps. As described above, the heightfield of some embodiments is represented by a raster image in which height information for the 3D is encoded. In some embodiments, the map label data storage 1060 stores polygon data for road ribbons, icons for POIs, names for POIs, names for roads, etc. The rendered map views storage 1065 stores rendered views of maps that, in some embodiments are for display on a display screen of a device on which the mapping application is running.

In some embodiments, the storages 1040-1065 are implemented in one physical storage while, in other embodiments, the storages 1040-1065 are implemented on separate physical storages. Still, in some embodiments, some or all of the storages 10240-1065 are implemented across several physical storages.

The geo services module 1010 is responsible for retrieving geo data for the map layout generator 1025. In some embodiments, the geo services module 1010 is implemented as a set of services that receives requests from an image processor for a particular set of geo data (e.g., geo data for a region of a map). When the geo services module 1010 receives such requests from an image processor, the geo services module 1010 of some embodiments retrieves the requested set of geo data from a map service 1005 (e.g., via a network, such as the Internet) for providing map information and other map-related data, a local cache for storing cached geo data, a local storage for storing geo data, or any combination of aforementioned sources of geo data. Additional and/or different sources of geo data may be used in some embodiments. In some embodiments, the geo services module 1010 passes the requested set of geo data to an image processor while, in other embodiments, the geo services module 1010 stores the requested set of geo data in the geo services data storage 1040 for the map layout generator 1025 to subsequently access.

In some embodiments, the virtual camera manager 1020 manages one or more virtual camera used for rendering views of 3D map. As explained above, a virtual camera in some embodiments is a conceptualization of the position in the 3D map from which the mapping application renders a map view of the 3D map. The virtual camera manager 1020 adjusts the position and orientation of the virtual camera in the 3D map based on input data that the virtual camera manager 1020 receives from the input recognition module 1015. For instance, the virtual camera manager 1020 adjusts the vertical height of the virtual camera with respect to the 3D map when the virtual camera manager 1020 receives input data to zoom into or out from the 3D map, adjusts the tilt angle of the virtual camera when the virtual camera manager 1020 receives input data to tilt the 3D map, adjusts the horizontal plane position of the virtual camera with respect to the 3D map when the virtual camera manager 1020 receives input data to pan the 3D map, etc. The virtual camera manager 1020 sends the rendering engine 1035 the position of the virtual camera in the 3D map when the virtual camera manager 1020 receives such a request from the rendering engine 1035.

The map layout generator 1025 generates map layouts of 3D maps that are used by the rendering engine 1035 to render views of the 3D maps. When the map layout generator 1025 receives a request for a map layout from the rendering engine 1035, the map layout generator 1025 of some embodiments checks a local cache storing geo map data for geo map data that it needs to generate the requested map layout. For geo map data that is not in the local cache, the map layout generator 1025 requests and receives the data from the geo services module 1010. The map layout generator 1025 then generates a map layout of a 3D map based on the geo map data and sends it to the rendering engine 1035.

In some embodiments, the map label manager 1030 manages map labels for 3D maps. When the map label manager 1030 receives a request for map labels for portion of a 3D map from the rendering engine 1035, the map label manager 1030 determines the map labels to render and the manner in which they are rendered for the portion of the 3D map. For instance, the map label manager 1030 handles the road ribbons for the portion of the 3D map that includes the positioning of road ribbons, specifying fading for road ribbons, and specifying whether road ribbons are to be rendered, etc. In some embodiments, the map label manager 1030 uses the stylesheet data stored in the storage 1050 and the position of the virtual camera that the map label manager 1030 receives from the virtual camera manager 1020.

The rendering engine 1035 handles the rendering of map views for display on a display screen of a device on which the mapping application 1000 operates. In some embodiments, rendering engine 1035 renders a map view based on information (e.g., input information, such as touch input, gesture input, motion input, audio input, etc.) received from the input recognition module 1015. Based on the information from the input recognition module 1015, rendering engine 1035 requests geo data from the map layout generator 1025, which in turn requests it from the geo services module 1010 for rendering the map view. The rendering engine 1035 of some embodiments (1) receives a map layout from the map layout generator 1025 based on the requested geo data and (2) renders a view of the layout of the map identified by a position of a virtual camera received from the virtual camera manager 1020. Once the map view is rendered, the rendering engine 1035 of some embodiments stores the map view in the rendered map views storage 1065 for the mapping application 1000 to access and display on the display screen of the device.

The input recognition module 1015 identifies the type of and interprets input data received from input device drivers (not shown in FIG. 10), such as a touchscreen device driver, an audio device driver, a motion device driver, etc. that are part of an operating system running on the device. In some embodiments, the input device drivers translate signals from input devices and/or input sensors into input data that is provided to the input recognition module 1015.

While many of the features have been described as being performed by one module (e.g., the geo services module 1010, the rendering engine 1035, etc.), one of ordinary skill in the art would recognize that the functions might be split up into multiple modules. Similarly, the functions described as being performed by multiple different modules might be performed by a single module in some embodiments (e.g., the map layout generator 1025 might be part of the geo services module 1010).

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 11:
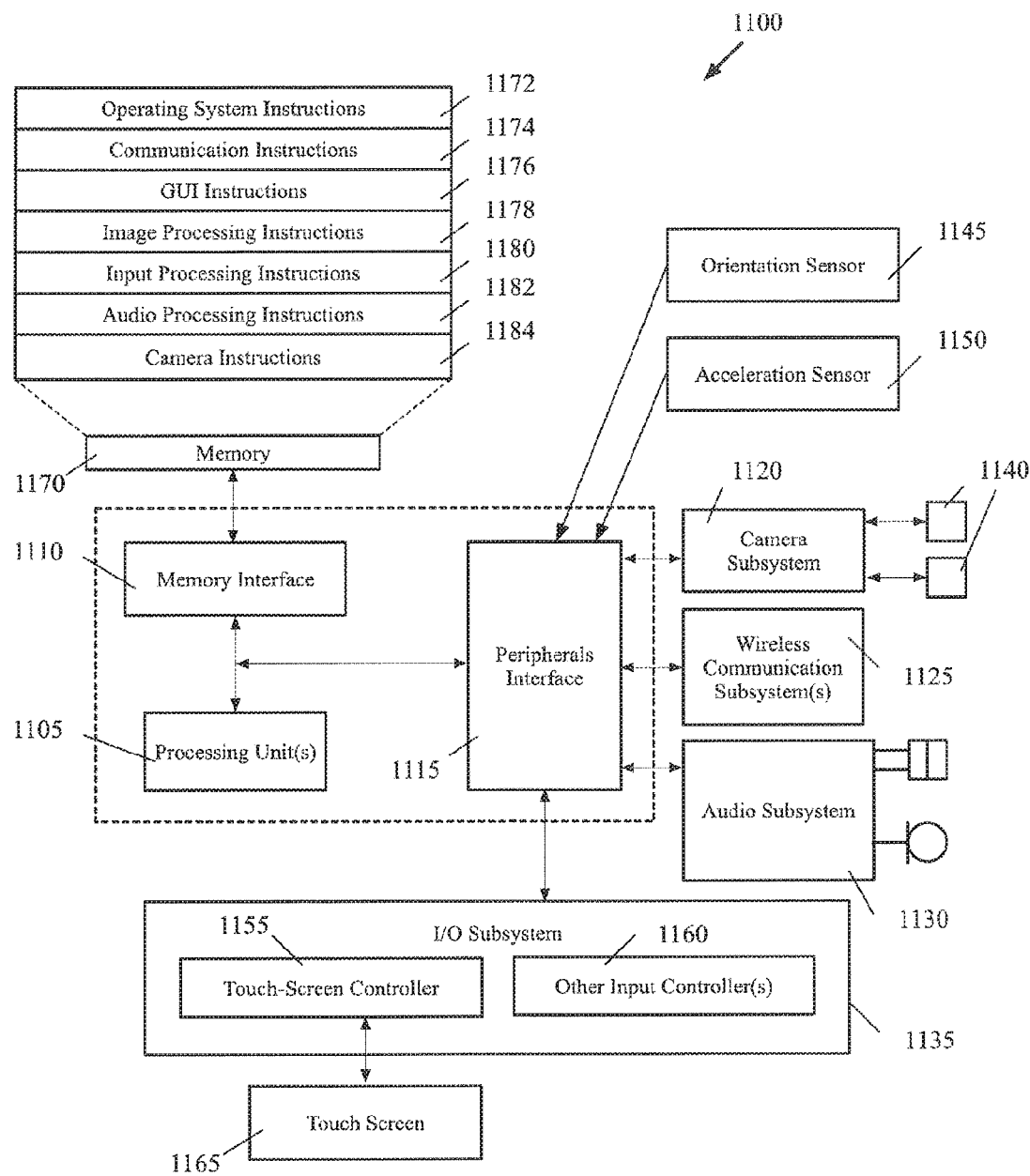
FIG. 11 is an example of an architecture of a mobile computing device.

The mapping application of some embodiments operate on mobile devices, such as smart phones (e.g., iPhones®) and tablets (e.g., iPads®). FIG. 11 is an example of an architecture 1100 of such a mobile computing device. Examples of mobile computing devices include smartphones, tablets, laptops, etc. As shown, the mobile computing device 1100 includes one or more processing units 1105, a memory interface 1110 and a peripherals interface 1115.

The peripherals interface 1115 is coupled to various sensors and subsystems, including a camera subsystem 1120, a wireless communication subsystem(s) 1125, an audio subsystem 1130, an I/O subsystem 1135, etc. The peripherals interface 1115 enables communication between the processing units 1105 and various peripherals. For example, an orientation sensor 1145 (e.g., a gyroscope) and an acceleration sensor 1150 (e.g., an accelerometer) is coupled to the peripherals interface 1115 to facilitate orientation and acceleration functions.

The camera subsystem 1120 is coupled to one or more optical sensors 1140 (e.g., a charged coupled device (CCD) optical sensor, a complementary metal-oxide-semiconductor (CMOS) optical sensor, etc.). The camera subsystem 1120 coupled with the optical sensors 1140 facilitates camera functions, such as image and/or video data capturing. The wireless communication subsystem 1125 serves to facilitate communication functions. In some embodiments, the wireless communication subsystem 1125 includes radio frequency receivers and transmitters, and optical receivers and transmitters (not shown in FIG. 11). These receivers and transmitters of some embodiments are implemented to operate over one or more communication networks such as a GSM network, a Wi-Fi network, a Bluetooth network, etc. The audio subsystem 1130 is coupled to a speaker to output audio (e.g., to output voice navigation instructions). Additionally, the audio subsystem 1130 is coupled to a microphone to facilitate voice-enabled functions, such as voice recognition (e.g., for searching), digital recording, etc.

The I/O subsystem 1135 involves the transfer between input/output peripheral devices, such as a display, a touchscreen, etc., and the data bus of the processing units 1105 through the peripherals interface 1115. The I/O subsystem 1135 includes a touchscreen controller 1155 and other input controllers 1160 to facilitate the transfer between input/output peripheral devices and the data bus of the processing units 1105. As shown, the touchscreen controller 1155 is coupled to a touchscreen 1165. The touchscreen controller 1155 detects contact and movement on the touchscreen 1165 using any of multiple touch sensitivity technologies. The other input controllers 1160 are coupled to other input/control devices, such as one or more buttons. Some embodiments include a near-touch sensitive screen and a corresponding controller that can detect near-touch interactions instead of or in addition to touch interactions.

The memory interface 1110 is coupled to memory 1170. In some embodiments, the memory 1170 includes volatile memory (e.g., high-speed random access memory), non-volatile memory (e.g., flash memory), a combination of volatile and non-volatile memory, and/or any other type of memory. As illustrated in FIG. 11, the memory 1170 stores an operating system (OS) 1172. The OS 1172 includes instructions for handling basic system services and for performing hardware dependent tasks.

The memory 1170 also includes communication instructions 1174 to facilitate communicating with one or more additional devices; graphical user interface instructions 1176 to facilitate graphic user interface processing; image processing instructions 1178 to facilitate image-related processing and functions; input processing instructions 1180 to facilitate input-related (e.g., touch input) processes and functions; audio processing instructions 1182 to facilitate audio-related processes and functions; and camera instructions 1184 to facilitate camera-related processes and functions. The instructions described above are merely exemplary and the memory 1170 includes additional and/or other instructions in some embodiments. For instance, the memory for a smartphone may include phone instructions to facilitate phone-related processes and functions. Additionally, the memory may include instructions for a mapping application as well as other applications. The above-identified instructions need not be implemented as separate software programs or modules. Various functions of the mobile computing device can be implemented in hardware and/or in software, including in one or more signal processing and/or application specific integrated circuits.

While the components illustrated in FIG. 11 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 11 may be split into two or more integrated circuits.

B. Computer System

Figure 12:
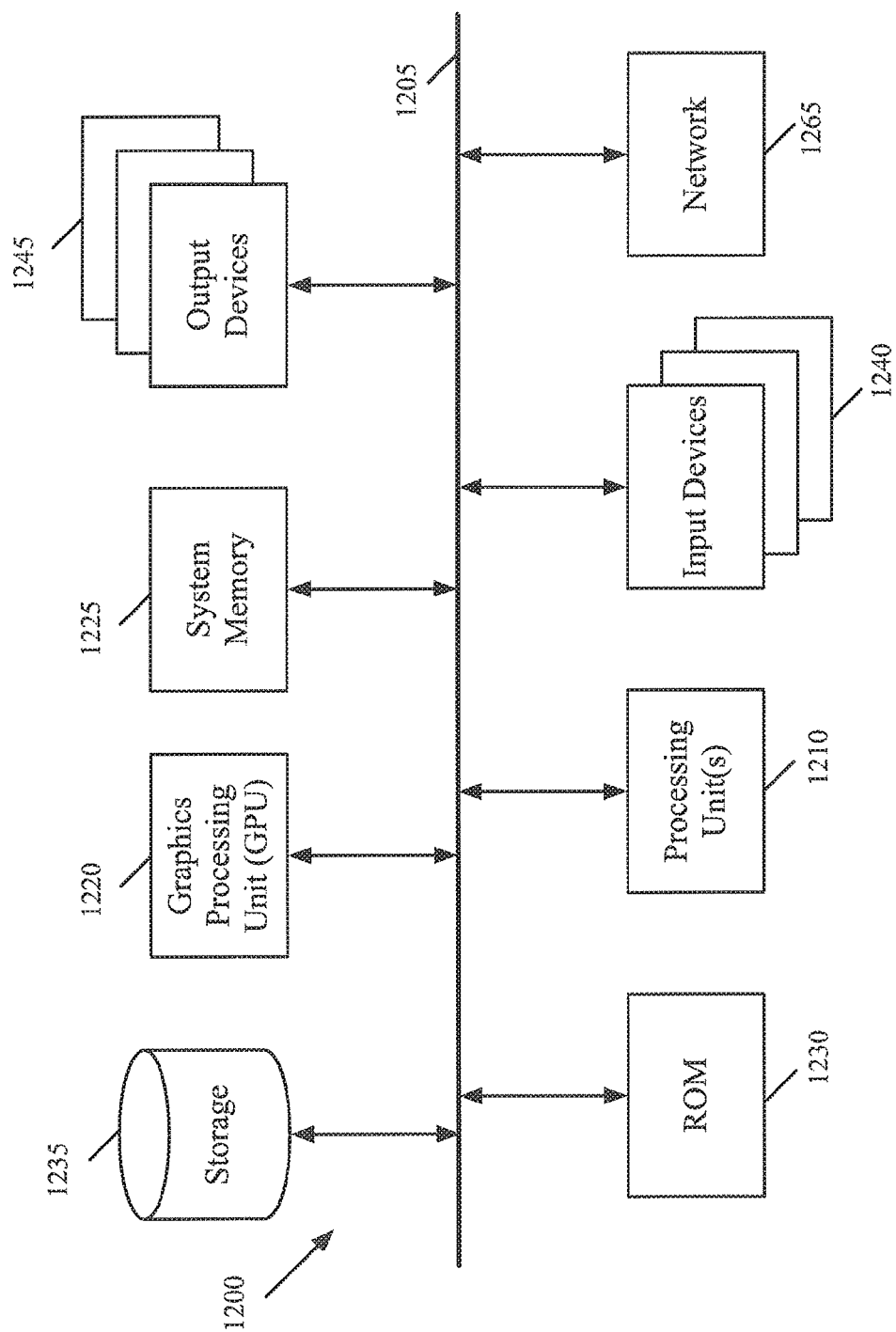
FIG. 12 conceptually illustrates an example of an electronic system with which some embodiments of the invention are implemented.

FIG. 12 conceptually illustrates another example of an electronic system 1200 with which some embodiments of the invention are implemented. The electronic system 1200 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1200 includes a bus 1205, processing unit(s) 1210, a graphics processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the read-only memory 1230, the GPU 1215, the system memory 1220, and the permanent storage device 1235.

From these various memory units, the processing unit(s) 1210 retrieves instructions to execute and data to process in order to execute the processes of the invention. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are needed by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the invention use a mass-storage device (such as a magnetic or optical disk and its corresponding disk drive, integrated flash memory) as the permanent storage device 1235.

Other embodiments use a removable storage device (such as a floppy disk, flash memory device, etc., and its corresponding drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor needs at runtime. In some embodiments, the invention's processes are stored in the system memory 1220, the permanent storage device 1235, and/or the read-only memory 1230. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alpha-numeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

V. Map Service Environment

Figure 13:
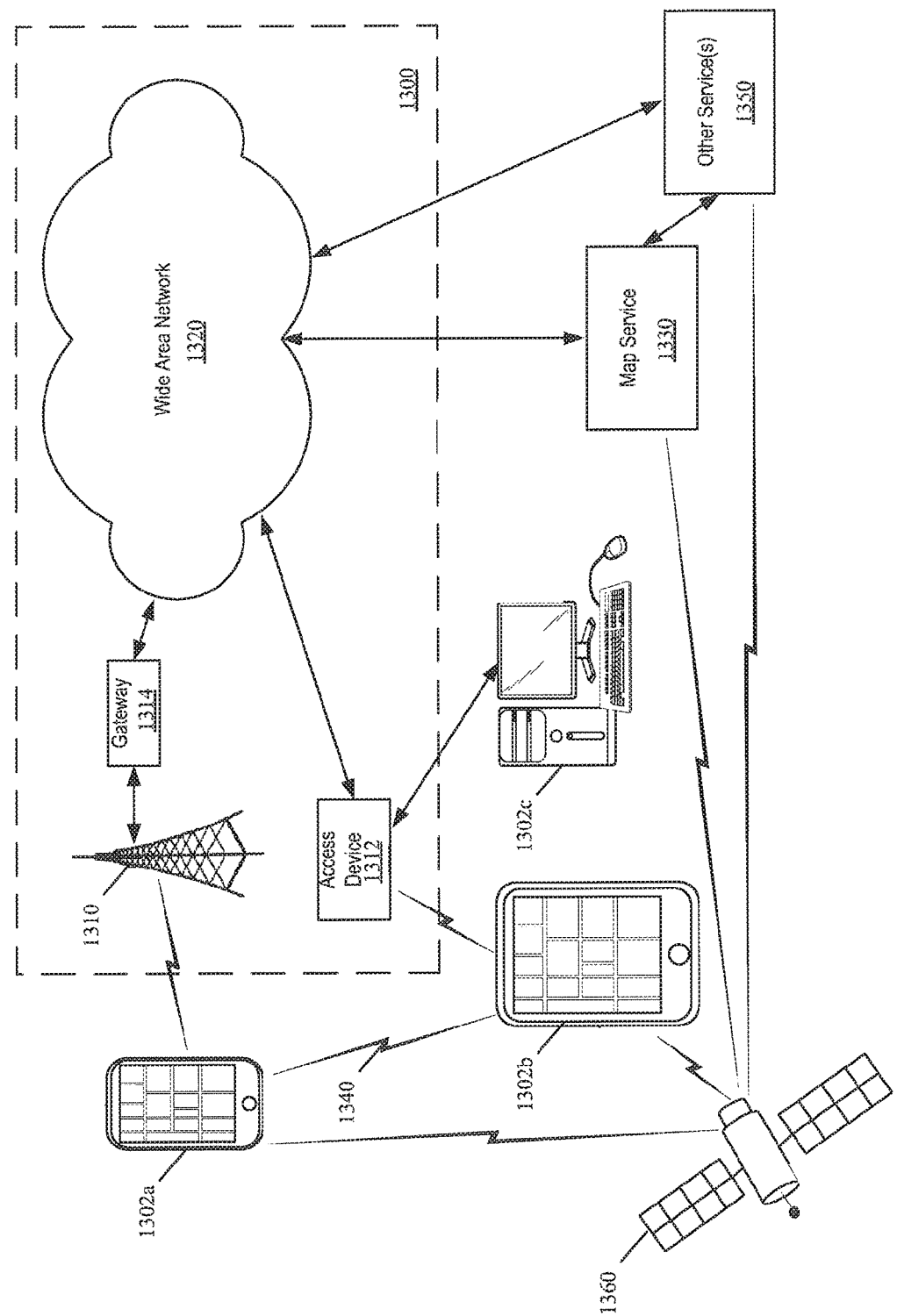
FIG. 13 a map service operating environment according to some embodiments.

Various embodiments may operate within a map service operating environment. FIG. 13 illustrates a map service operating environment, according to some embodiments. A map service 1330 (also referred to as mapping service) may provide map services for one or more client devices 1302a-1302c in communication with the map service 1330 through various communication methods and protocols. A map service 1330 in some embodiments provides map information and other map-related data, such as two-dimensional map image data (e.g., aerial view of roads utilizing CCIs), three-dimensional map image data (e.g., traversable map with three-dimensional features, such as buildings), route and direction calculations (e.g., ferry route calculations or directions between two points for a pedestrian), real-time navigation data (e.g., turn-by-turn visual navigation data in two or three dimensions), location data (e.g., where the client device currently is located), and other geographic data (e.g., wireless network coverage, weather, traffic information, or nearby points-of-interest). In various embodiments, the map service data may include localized labels for different countries or regions. Localized labels may be utilized to present map labels (e.g., street names, city names, points of interest) in different languages on client devices. Client devices 1302a-1302c may utilize these map services by obtaining map service data. Client devices 1302a-1302c may implement various techniques to process map service data. Client devices 1302a-1302c may then provide map services to various entities, including, but not limited to, users, internal software or hardware modules, and/or other systems or devices external to the client devices 1302a-1302c.

In some embodiments, a map service is implemented by one or more nodes in a distributed computing system. Each node may be assigned one or more services or components of a map service. Some nodes may be assigned the same map service or component of a map service. A load balancing node in some embodiments distributes access or requests to other nodes within a map service. In some embodiments a map service is implemented as a single system, such as a single server. Different modules or hardware devices within a server may implement one or more of the various services provided by a map service.

A map service in some embodiments provides map services by generating map service data in various formats. In some embodiments, one format of map service data is map image data. Map image data provides image data to a client device so that the client device may process the image data (e.g., rendering and/or displaying the image data as a two-dimensional or three-dimensional map). Map image data, whether in two or three dimensions, may specify one or more map tiles. A map tile may be a portion of a larger map image. Assembling together the map tiles of a map produces the original map. Tiles may be generated from map image data, routing or navigation data, or any other map service data. In some embodiments map tiles are raster-based map tiles, with tile sizes ranging from any size both larger and smaller than a commonly-used 256 pixel by 256 pixel tile. Raster-based map tiles may be encoded in any number of standard digital image representations including, but not limited to, Bitmap (.bmp), Graphics Interchange Format (.gif), Joint Photographic Experts Group (.jpg, .jpeg, etc.), Portable Networks Graphic (.png), or Tagged Image File Format (.tiff). In some embodiments, map tiles are vector-based map tiles, encoded using vector graphics, including, but not limited to, Scalable Vector Graphics (.svg) or a Drawing File (.drw). Some embodiments also include tiles with a combination of vector and raster data. Metadata or other information pertaining to the map tile may also be included within or along with a map tile, providing further map service data to a client device. In various embodiments, a map tile is encoded for transport utilizing various standards and/or protocols, some of which are described in examples below.

In various embodiments, map tiles may be constructed from image data of different resolutions depending on zoom level. For instance, for low zoom level (e.g., world or globe view), the resolution of map or image data need not be as high relative to the resolution at a high zoom level (e.g., city or street level). For example, when in a globe view, there may be no need to render street level artifacts as such objects would be so small as to be negligible in many cases.

A map service in some embodiments performs various techniques to analyze a map tile before encoding the tile for transport. This analysis may optimize map service performance for both client devices and a map service. In some embodiments map tiles are analyzed for complexity, according to vector-based graphic techniques, and constructed utilizing complex and non-complex layers. Map tiles may also be analyzed for common image data or patterns that may be rendered as image textures and constructed by relying on image masks. In some embodiments, raster-based image data in a map tile contains certain mask values, which are associated with one or more textures. Some embodiments also analyze map tiles for specified features that may be associated with certain map styles that contain style identifiers.

Other map services generate map service data relying upon various data formats separate from a map tile in some embodiments. For instance, map services that provide location data may utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Embodiments may also receive or request data from client devices identifying device capabilities or attributes (e.g., hardware specifications or operating system version) or communication capabilities (e.g., device communication bandwidth as determined by wireless signal strength or wired or wireless network type).

A map service may obtain map service data from internal or external sources. For example, CCIs used in map image data may be obtained from external services, or internal systems, storage devices, or nodes. Other examples may include, but are not limited to, GPS assistance servers, wireless network coverage databases, business or personal directories, weather data, government information (e.g., construction updates or road name changes), or traffic reports. Some embodiments of a map service may update map service data (e.g., wireless network coverage) for analyzing future requests from client devices.

Various embodiments of a map service respond to client device requests for map services. These requests may be a request for a specific map or portion of a map. Some embodiments format requests for a map as requests for certain map tiles. In some embodiments, requests also supply the map service with starting locations (or current locations) and destination locations for a route calculation. A client device may also request map service rendering information, such as map textures or style sheets. In at least some embodiments, requests are also one of a series of requests implementing turn-by-turn navigation. Requests for other geographic data may include, but are not limited to, current location, wireless network coverage, weather, traffic information, or nearby points-of-interest.

A map service, in some embodiments, analyzes client device requests to optimize a device or map service operation. For instance, a map service may recognize that the location of a client device is in an area of poor communications (e.g., weak wireless signal) and send more map service data to supply a client device in the event of loss in communication or send instructions to utilize different client hardware (e.g., orientation sensors) or software (e.g., utilize wireless location services or Wi-Fi positioning instead of GPS-based services). In another example, a map service may analyze a client device request for vector-based map image data and determine that raster-based map data better optimizes the map image data according to the image's complexity. Embodiments of other map services may perform similar analysis on client device requests and as such the above examples are not intended to be limiting.

Various embodiments of client devices (e.g., client devices 1302a-1302c) are implemented on different portable-multifunction device types. Client devices 1302a-1302c utilize map service 1330 through various communication methods and protocols. In some embodiments, client devices 1302a-1302c obtain map service data from map service 1330. Client devices 1302a-1302c request or receive map service data. Client devices 1302a-1302c then process map service data (e.g., render and/or display the data) and may send the data to another software or hardware module on the device or to an external device or system.

A client device, according to some embodiments, implements techniques to render and/or display maps. These maps may be requested or received in various formats, such as map tiles described above. A client device may render a map in two-dimensional or three-dimensional views. Some embodiments of a client device display a rendered map and allow a user, system, or device providing input to manipulate a virtual camera in the map, changing the map display according to the virtual camera's position, orientation, and field-of-view. Various forms and input devices are implemented to manipulate a virtual camera. In some embodiments, touch input, through certain single or combination gestures (e.g., touch-and-hold or a swipe) manipulate the virtual camera. Other embodiments allow manipulation of the device's physical location to manipulate a virtual camera. For instance, a client device may be tilted up from its current position to manipulate the virtual camera to rotate up. In another example, a client device may be tilted forward from its current position to move the virtual camera forward. Other input devices to the client device may be implemented including, but not limited to, auditory input (e.g., spoken words), a physical keyboard, mouse, and/or a joystick.

Some embodiments provide various visual feedback to virtual camera manipulations, such as displaying an animation of possible virtual camera manipulations when transitioning from two-dimensional map views to three-dimensional map views. Some embodiments also allow input to select a map feature or object (e.g., a building) and highlight the object, producing a blur effect that maintains the virtual camera's perception of three-dimensional space.

In some embodiments, a client device implements a navigation system (e.g., turn-by-turn navigation). A navigation system provides directions or route information, which may be displayed to a user. Some embodiments of a client device request directions or a route calculation from a map service. A client device may receive map image data and route data from a map service. In some embodiments, a client device implements a turn-by-turn navigation system, which provides real-time route and direction information based upon location information and route information received from a map service and/or other location system, such as a Global Positioning Satellite (GPS) system. A client device may display map image data that reflects the current location of the client device and update the map image data in real-time. A navigation system may provide auditory or visual directions to follow a certain route.

A virtual camera is implemented to manipulate navigation map data according to some embodiments. Some embodiments of client devices allow the device to adjust the virtual camera display orientation to bias toward the route destination. Some embodiments also allow the virtual camera to navigation turns simulating the inertial motion of the virtual camera.

Client devices implement various techniques to utilize map service data from map service. Some embodiments implement some techniques to optimize rendering of two-dimensional and three-dimensional map image data. In some embodiments, a client device locally stores rendering information. For instance, a client stores a style sheet which provides rendering directions for image data containing style identifiers. In another example, common image textures may be stored to decrease the amount of map image data transferred from a map service. Client devices in different embodiments implement various modeling techniques to render two-dimensional and three-dimensional map image data, examples of which include, but are not limited to: generating three-dimensional buildings out of two-dimensional building footprint data; modeling two-dimensional and three-dimensional map objects to determine the client device communication environment; generating models to determine whether map labels are seen from a certain virtual camera position; and generating models to smooth transitions between map image data. In some embodiments, the client devices also order or prioritize map service data in certain techniques. For instance, a client device detects the motion or velocity of a virtual camera, which if exceeding certain threshold values, lower-detail image data is loaded and rendered for certain areas. Other examples include: rendering vector-based curves as a series of points, preloading map image data for areas of poor communication with a map service, adapting textures based on display zoom level, or rendering map image data according to complexity.

In some embodiments, client devices communicate utilizing various data formats separate from a map tile. For instance, some client devices implement Assisted Global Positioning Satellites (A-GPS) and communicate with location services that utilize data formats conforming to location service protocols, such as, but not limited to, Radio Resource Location services Protocol (RRLP), TIA 801 for Code Division Multiple Access (CDMA), Radio Resource Control (RRC) position protocol, or LTE Positioning Protocol (LPP). Client devices may also receive GPS signals directly. Embodiments may also send data, with or without solicitation from a map service, identifying the client device's capabilities or attributes (e.g., hardware specifications or operating system version) or communication capabilities (e.g., device communication bandwidth as determined by wireless signal strength or wired or wireless network type).

FIG. 13 illustrates one possible embodiment of an operating environment 1300 for a map service 1330 and client devices 1302a-1302c. In some embodiments, devices 1302a, 1302b, and 1302c communicate over one or more wired or wireless networks 1310. For example, wireless network 1310, such as a cellular network, can communicate with a wide area network (WAN) 1320, such as the Internet, by use of gateway 1314. A gateway 1314 in some embodiments provides a packet oriented mobile data service, such as General Packet Radio Service (GPRS), or other mobile data service allowing wireless networks to transmit data to other networks, such as wide area network 1320. Likewise, access device 1312 (e.g., IEEE 802.11g wireless access device) provides communication access to WAN 1320. Devices 1302*a* and 1302*b* can be any portable electronic or computing device capable of communicating with a map service. Device 1302*c* can be any non-portable electronic or computing device capable of communicating with a map service.

In some embodiments, both voice and data communications are established over wireless network 1310 and access device 1312. For instance, device 1302*a* can place and receive phone calls (e.g., using voice over Internet Protocol (VoIP) protocols), send and receive e-mail messages (e.g., using Simple Mail Transfer Protocol (SMTP) or Post Office Protocol 3 (POP3)), and retrieve electronic documents and/or streams, such as web pages, photographs, and videos, over wireless network 1310, gateway 1314, and WAN 1320 (e.g., using Transmission Control Protocol/Internet Protocol (TCP/IP) or User Datagram Protocol (UDP)). Likewise, in some implementations, devices 1302*b* and 1302*c* can place and receive phone calls, send and receive e-mail messages, and retrieve electronic documents over access device 1312 and WAN 1320. In various embodiments, any of the illustrated client devices may communicate with map service 1330 and/or other service(s) 1350 using a persistent connection established in accordance with one or more security protocols, such as the Secure Sockets Layer (SSL) protocol or the Transport Layer Security (TLS) protocol.

Devices 1302*a* and 1302*b* can also establish communications by other means. For example, wireless device 1302*a* can communicate with other wireless devices (e.g., other devices 1302*b*, cell phones, etc.) over the wireless network 1310. Likewise devices 1302*a* and 1302*b* can establish peer-to-peer communications 1340 (e.g., a personal area network) by use of one or more communication subsystems, such as Bluetooth® communication from Bluetooth Special Interest Group, Inc. of Kirkland, Wash. Device 1302*c* can also establish peer to peer communications with devices 1302*a* or 1302*b* (not shown). Other communication protocols and topologies can also be implemented. Devices 1302*a* and 1302*b* may also receive Global Positioning Satellite (GPS) signals from GPS satellites 1360.

Devices 1302*a*, 1302*b*, and 1302*c* can communicate with map service 1330 over one or more wire and/or wireless networks, 1310 or 1312. For instance, map service 1330 can provide map service data to rendering devices 1302*a*, 1302*b*, and 1302*c*. Map service 1330 may also communicate with other services 1350 to obtain data to implement map services. Map service 1330 and other services 1350 may also receive GPS signals from GPS satellites 1360.

In various embodiments, map service 1330 and/or other service(s) 1350 are configured to process search requests from any of the client devices. Search requests may include but are not limited to queries for businesses, addresses, residential locations, points of interest, or some combination thereof. Map service 1330 and/or other service(s) 1350 may be configured to return results related to a variety of parameters including but not limited to a location entered into an address bar or other text entry field (including abbreviations and/or other shorthand notation), a current map view (e.g., user may be viewing one location on the multifunction device while residing in another location), current location of the user (e.g., in cases where the current map view did not include search results), and the current route (if any). In various embodiments, these parameters may affect the composition of the search results (and/or the ordering of the search results) based on different priority weightings. In various embodiments, the search results that are returned may be a subset of results selected based on specific criteria including but not limited to a quantity of times the search result (e.g., a particular point of interest) has been requested, a measure of quality associated with the search result (e.g., highest user or editorial review rating), and/or the volume of reviews for the search results (e.g., the number of times the search result has been review or rated).

In various embodiments, map service 1330 and/or other service(s) 1350 are configured to provide auto-complete search results that are displayed on the client device, such as within the mapping application. For instance, auto-complete search results may populate a portion of the screen as the user enters one or more search keywords on the multifunction device. In some cases, this feature may save the user time as the desired search result may be displayed before the user enters the full search query. In various embodiments, the auto complete search results may be search results found by the client on the client device (e.g., bookmarks or contacts), search results found elsewhere (e.g., from the Internet) by map service 1330 and/or other service(s) 1350, and/or some combination thereof. As is the case with commands, any of the search queries may be entered by the user via voice or through typing. The multifunction device may be configured to display search results graphically within any of the map display described herein. For instance, a pin or other graphical indicator may specify locations of search results as points of interest. In various embodiments, responsive to a user selection of one of these points of interest (e.g., a touch selection, such as a tap), the multifunction device is configured to display additional information about the selected point of interest including but not limited to ratings, reviews or review snippets, hours of operation, store status (e.g., open for business, permanently closed, etc.), and/or images of a storefront for the point of interest. In various embodiments, any of this information may be displayed on a graphical information card that is displayed in response to the user's selection of the point of interest.

In various embodiments, map service 1330 and/or other service(s) 1350 provide one or more feedback mechanisms to receive feedback from client devices 1302*a*-1302*c*. For instance, client devices may provide feedback on search results to map service 1330 and/or other service(s) 1350 (e.g., feedback specifying ratings, reviews, temporary or permanent business closures, errors etc.); this feedback may be used to update information about points of interest in order to provide more accurate or more up-to-date search results in the future. In some embodiments, map service 1330 and/or other service(s) 1350 may provide testing information to the client device (e.g., an AB test) to determine which search results are best. For instance, at random intervals, the client device may receive and present two search results to a user and allow the user to indicate the best result. The client device may report the test results to map service 1330 and/or other service(s) 1350 to improve future search results based on the chosen testing technique, such as an A/B test technique in which a baseline control sample is compared to a variety of single-variable test samples in order to improve results.

While the invention has been described with reference to numerous specific details, one of ordinary skill in the art will recognize that the invention can be embodied in other specific forms without departing from the spirit of the invention. In addition, a number of the figures (including FIGS. 4 and 8) conceptually illustrate a process. The specific operations of this process may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
    at an electronic device with one or more processors, a memory, and a touch screen display:
        displaying a map user interface on the touch screen display, including concurrently displaying:
            a map that includes one or more 3D map features; and
            a graphical location indicator in the map, wherein the graphical location indicator is a point of interest (POI) indicator that corresponds to a respective location in the map and is displayed in a predefined relation to the one or more 3D map features;
        while displaying the map user interface with the graphical location indicator displayed in the predefined relation to the one or more 3D features without being obscured, receiving a request to rotate the map;
        in response to receiving the request to rotate the map:
            rotate the map;
            in accordance with a determination that, as a result of the rotation of the map, the respective location is obscured by a respective 3D map feature of the one or more 3D map features, wherein the respective 3D map feature is a building, vertically shifting the graphical location indicator relative to the one or more 3D features in the map while maintaining the position of the graphical location indicator with respect to a 2D location on a surface of the map, so that the graphical location indicator is visible in the map user interface; and
            in accordance with a determination that, as a result of the rotation of the map, the respective location is not obscured by the one or more 3D map features, maintaining the graphical location indicator in the predefined relation to the one or more 3D features.

2. The method of claim 1, wherein vertically shifting the graphical location indicator relative to the one or more 3D features in the map includes extending the graphical location indicator above the respective 3D map feature in the 3D map.

3. The method of claim 1, wherein the graphical location indicator is 3 dimensional.

4. The method of claim 1, wherein the request to rotate the map is a touch input on the touch screen display in a first direction and the map is rotated in the first direction.

5. The method of claim 1, wherein vertically shifting the graphical location indicator relative to the one or more 3D features in the map includes shifting at least a portion of the graphical location indicator away from the respective location in the map.

6. The method of claim 1, wherein the graphical location indicator is positioned at the respective location specified by a user.

7. The method of claim 1, wherein the vertically shifting the graphical location indicator relative to the one or more 3D features in the map includes displaying the graphical location indicator above the respective 3D map feature.

8. A non-transitory computer readable storage medium storing one or more programs, the one or more programs comprising instructions, which when executed by an electronic device with a touch screen display, cause the device to:
    display a map user interface on the touch screen display, including concurrently displaying:
        a map that includes one or more 3D map features; and
        a graphical location indicator in the map, wherein the graphical location indicator is a point of interest (POI) indicator that corresponds to a respective location in the map and is displayed in a predefined relation to the one or more 3D map features;
    while displaying the map user interface with the graphical location indicator displayed in the predefined relation to the one or more 3D features, receive a request to rotate the map;
    in response to receiving the request to rotate the map:
        rotating the map;
        in accordance with a determination that, as a result of the rotation of the map, the respective location is obscured by a respective 3D map feature of the one or more 3D map features, wherein the respective 3D map feature is a building, vertically shift the graphical location indicator relative to the one or more 3D features in the map while maintaining the position of the graphical location indicator with respect to a 2D location on a surface of the map, so that the graphical location indicator is visible in the map user interface; and
        in accordance with a determination that, as a result of the rotation of the map, the respective location is not obscured by the one or more 3D map features, maintain the graphical location indicator in the predefined relation to the one or more 3D features.

9. The computer readable storage medium of claim 8, wherein vertically shifting the graphical location indicator relative to the one or more 3D features in the map includes extending the graphical location indicator above the respective 3D map feature in the 3D map.

10. The computer readable storage medium of claim 8, wherein the graphical location indicator is 3 dimensional.

11. The computer readable storage medium of claim 8, wherein the request to rotate the map is a touch input on the touch screen display in a first direction and the map is rotated in the first direction.

12. The computer readable storage medium of claim 8, wherein the vertically shifting the graphical location indicator relative to the one or more 3D features in the map includes displaying the graphical location indicator above the respective 3D map feature.

13. An electronic device, comprising:
    a touch screen display;
    one or more processors;
    memory; and
    one or more programs, wherein the one or more programs are stored in the memory and configured to be executed by the one or more processors, the one or more programs including instructions for:
        displaying a map user interface on the touch screen display, including concurrently displaying:
            a map that includes one or more 3D map features; and a graphical location indicator in the map, wherein the graphical location indicator is a point of interest (POI) indicator that corresponds to a respective location in the map and is displayed in a predefined relation to the one or more 3D map features;

while displaying the map user interface with the graphical location indicator displayed in the predefined relation to the one or more 3D features without being obscured, receiving a request to rotate the map;

in response to receiving the request to rotate the map: rotating the map;

in accordance with a determination that, as a result of the rotation of the map, the respective location is obscured by a respective 3D map feature of the one or more 3D map features, wherein the respective 3D map feature is a building, vertically shifting the graphical location indicator relative to the one or more 3D features in the map while maintaining the position of the graphical location indicator with respect to a 2D location on a surface of the map, so that the graphical location indicator is visible in the map user interface; and in accordance with a determination that, as a result of the rotation of the map, the respective location is not obscured by the one or more 3D map features, maintaining the graphical location indicator in the predefined relation to the one or more 3D features.

14. The device of claim 13, wherein vertically shifting the graphical location indicator relative to the one or more 3D features in the map includes extending the graphical location indicator above the respective 3D map feature in the 3D map.

15. The device of claim 13, wherein the graphical location indicator is 3 dimensional.

16. The device of claim 13, wherein the request to rotate the map is a touch input on the touch screen display in a first direction and the map is rotated in the first direction.

17. The electronic device of claim 13, wherein the vertically shifting the graphical location indicator relative to the one or more 3D features in the map includes displaying the graphical location indicator above the respective 3D map feature.

18. A method for providing a three-dimensional (3D) view of a map, the method comprising:

at an electronic device with one or more processors, a memory, and a display:

rendering on the display the 3D view of a map comprising at least one 3D element and a graphical location indicator on the map, wherein the graphical location indicator is a point of interest (POI) indicator;

determining whether the graphical location indicator is occluded from view by the at least one 3D element after the at least one 3D element is rotated, wherein the at least one 3D element is a building;

upon determining that the graphical location indicator is occluded from view by the at least one 3D element as a result of the rotation of the map, vertically shifting the graphical location indicator relative to the at least one 3D element in the map while maintaining the position of the graphical location indicator with respect to a 2D location on a surface of the map, so that the graphical location indicator is visible despite being otherwise occluded from view by the at least one 3D element; and re-rendering the 3D view of the map comprising the at least one 3D element and the modified graphical location indicator.

19. The method of claim 18, wherein vertically shifting the graphical location indicator includes extending the graphical location indicator above the at least one 3D element.

20. The method of claim 18, wherein the display is a touch screen display, and the at least one 3D element is rotated in response to a touch input on the touch screen display.

* * * * *